(12) United States Patent
Seyed Fathi et al.

(10) Patent No.: US 12,332,938 B2
(45) Date of Patent: Jun. 17, 2025

(54) ORGANIZING MEDIA CONTENT ITEMS UTILIZING DETECTED SCENE TYPES

(71) Applicant: Dropbox, Inc., San Francisco, CA (US)

(72) Inventors: Sohrab Seyed Fathi, Saratoga, CA (US); Vasanth Krishna Namasivayam, Dublin, CA (US); Tal Tendler, Raanana (IL); Renana Albeg, Tel Aviv (IL); Nadav Goldin, Jerusalem (IL); Neeraj Kumar, Brooklyn, NY (US); Christopher T Lesniewski-Laas, Oakland, CA (US); Orly Tishbi, Herzliya (IL); Sigalit Sadeh, Tel Aviv (IL)

(73) Assignee: Dropbox, Inc., San Francisco, CA (US)

( * ) Notice: Subject to any disclaimer, the term of this patent is extended or adjusted under 35 U.S.C. 154(b) by 12 days.

(21) Appl. No.: 18/158,326

(22) Filed: Jan. 23, 2023

(65) Prior Publication Data

US 2024/0193207 A1    Jun. 13, 2024

Related U.S. Application Data

(60) Provisional application No. 63/386,628, filed on Dec. 8, 2022.

(51) Int. Cl.
*G06F 16/783* (2019.01)
*G06F 16/732* (2019.01)

(52) U.S. Cl.
CPC ........ *G06F 16/783* (2019.01); *G06F 16/7335* (2019.01)

(58) Field of Classification Search
CPC ............................ G06F 16/783; G06F 16/7335
See application file for complete search history.

(56) References Cited

U.S. PATENT DOCUMENTS

| 9,554,111 B2 | 1/2017 | Rav-Acha et al. |
| 9,711,182 B2 * | 7/2017 | Dharssi ................ H04N 21/812 |

(Continued)

FOREIGN PATENT DOCUMENTS

| CN | 109155136 B | 12/2020 |
| CN | 112966646 A | 6/2021 |
| CN | 113033507 B | 8/2021 |

OTHER PUBLICATIONS

Chasanis V. T., et al., "Scene Detection in Videos Using Shot Clustering and Sequence Alignment," IEEE Transactions on Multimedia, vol. 11, No. 1, Jan. 2009, pp. 89-100.

(Continued)

*Primary Examiner* — Jared M Bibbee
(74) *Attorney, Agent, or Firm* — Keller Preece PLLC

(57) ABSTRACT

This disclosure describes embodiments of systems, methods, and non-transitory computer readable storage media that can detect scene types across various portions of media content and display collections that organize segments (or portions) of media content (e.g., videos or images) according to the detected scene types for the media content files. For example, the disclosed systems can automatically identify content segments of media content that belong to one or more identified scene types and display the content segments organized by the different scene types. In order to determine the scene types for the content segments of the media content files, the disclosed systems can utilize machine learning that determines relevancies between data of the media content files and the scene types. Furthermore, the disclosed systems can display, within a GUI, the groupings of media content segments organized by the different scene types.

20 Claims, 16 Drawing Sheets

(56) References Cited

U.S. PATENT DOCUMENTS

| | | |
|---|---|---|
| 10,565,454 B2 | 2/2020 | Mehrseresht et al. |
| 10,679,063 B2 | 6/2020 | Cheng et al. |
| 10,699,115 B2 | 6/2020 | Saptharishi et al. |
| 11,048,919 B1* | 6/2021 | Modolo ................. G06V 20/40 |
| 11,869,240 B1* | 1/2024 | Patluri ............. H04N 21/23418 |
| 2011/0030031 A1* | 2/2011 | Lussier ................. H04L 65/756 |
| | | 709/219 |
| 2014/0006978 A1* | 1/2014 | Meehan ............... G11B 27/034 |
| | | 715/760 |
| 2017/0024614 A1 | 1/2017 | Sanil et al. |
| 2021/0272599 A1* | 9/2021 | Patterson ................. G06N 3/08 |
| 2022/0070501 A1* | 3/2022 | Davis ................. H04N 21/2743 |

OTHER PUBLICATIONS

Dunlop H., "Scene Classification of Images and Video via Semantic Segmentation," 2010 IEEE Computer Society Conference on Computer Vision and Pattern Recognition—Workshops, Jul. 2010, pp. 72-79.

* cited by examiner

ORGANIZING MEDIA CONTENT ITEMS UTILIZING DETECTED SCENE TYPES

CROSS-REFERENCE TO RELATED APPLICATIONS

This application claims priority to and the benefit of U.S. Provisional Patent Application No. 63/386,628, filed on Dec. 8, 2022, which is incorporated herein by reference in its entirety.

BACKGROUND

In recent years, online or "cloud" storage systems have increasingly stored and managed electronic media generated via client devices. For example, some existing document hosting systems provide tools for users to create, modify, delete, and share electronic media within a document or file synchronizing environment that is accessible through mobile applications or other software applications. By providing web-based (or app-based) tools for such document and file synchronization, existing document hosting systems often provide tools for users to retrieve, view, and modify a number of electronic media that are synchronized between multiple client devices of a user.

Despite such existing systems providing tools to retrieve, view, and modify a number of electronic media, these existing systems face a number of technical shortcomings in flexibly and efficiently organizing, managing, and displaying electronic media. For example, many existing systems enable an upload a number of electronic media that may portray various aspects of an event. To present electronic media files, oftentimes, existing document hosting systems provide rigid and inefficient graphical user interfaces (GUIs) that display the electronic media files with a capturing device created (or user created) file name of the electronic media file.

To illustrate, many existing document hosting systems provide inflexible GUIs that fail to present functionality beyond listing electronic media files, file names, and other technical data for the file. In many instances, existing systems may manage and present a large number of media files (e.g., videos or images) that portray various scenes of a single event (e.g., a wedding, sporting event, instructional video, real estate videos, hospitality videos) from different capturing devices. In some cases, the media files can portray the various aspects of an entire event in large capacity media files. Oftentimes, existing systems utilize rigid GUIs that only present the media files, file names, and other technical information for the files to enable editing, cutting, or identifying different scenes of the portrayed event in the media file(s). Existing systems with such rigid GUIs are often unable to provide access to functionalities that can assist in editing, cutting, or identifying different scenes of the portrayed event in the media file(s).

In addition to being rigid, many existing systems also are difficult to use when a large number of media files (e.g., videos or images) or large media files portray various scenes of a single event. In particular, existing systems oftentimes manage and present a large number of media files that require viewing each media file (e.g., viewing an entire video file) to identify specific scenes of a portrayed event. In many instances, it is often difficult and time consuming for users to view and organize a large number of media files in such existing systems. For example, in some cases, existing systems require a user to view or scan through media files to note portions of the media files that belong to particular scenes or create separate media files for those specific portions (e.g., by cutting or exporting files). Such a process requires an excessive amount of time when multiple media files or lengthy media files are present.

Furthermore, due to the lack of ease of use, many existing systems are also often navigationally and computationally inefficient. To illustrate, many existing systems require excessive user navigation to identify scenes within media files and organize the media files. For example, many existing systems require users to view or scan through media files to note portions of the media files that belong to particular scenes or create separate media files for those specific portions through user navigation on a GUI interface for video play back. However, such user navigation requires a user to utilize computational resources in the GUI interface for the video play back for an excessive amount of time (e.g., the length of a video file or multiple video files). Moreover, many existing systems require users to continuously switch between multiple GUIs on limited screen spaces of mobile devices (e.g., a file explorer GUI, a video editing GUI, a video play back GUI) to view or scan through media files to note portions of the media files that belong to particular scenes or create separate media files for those specific portions. Indeed, such user navigations inefficiently utilize computational resources and time resources within many existing document hosting systems.

SUMMARY

This disclosure describes one or more embodiments of systems, methods, and non-transitory computer readable storage media that provide benefits and/or solve one or more of the foregoing and other problems in the art. In particular, the disclosed systems can intelligently and automatically detect scene types across various portions of media content and display collections that organize segments (or portions) of media content (e.g., videos or images) according to the detected scene types for the media content files. In one or more implementations, the disclosed systems can automatically identify content segments of media content that belong to one or more identified scene types and display the content segments organized by the different scene types. In order to determine the scene types for the content segments of the media content files, the disclosed systems can utilize machine learning that determines relevancies between data of the media content files and the scene types. Furthermore, the disclosed systems can display, within a GUI, the groupings of media content segments organized by the different scene types (as collection objects), store the media content segments as additional media content files in association with the particular scene types, and/or export the media content segments grouped by the scene types to various media content editing applications.

BRIEF DESCRIPTION OF THE DRAWINGS

The detailed description is described with reference to the accompanying drawings in which.

DETAILED DESCRIPTION

Figure 1:
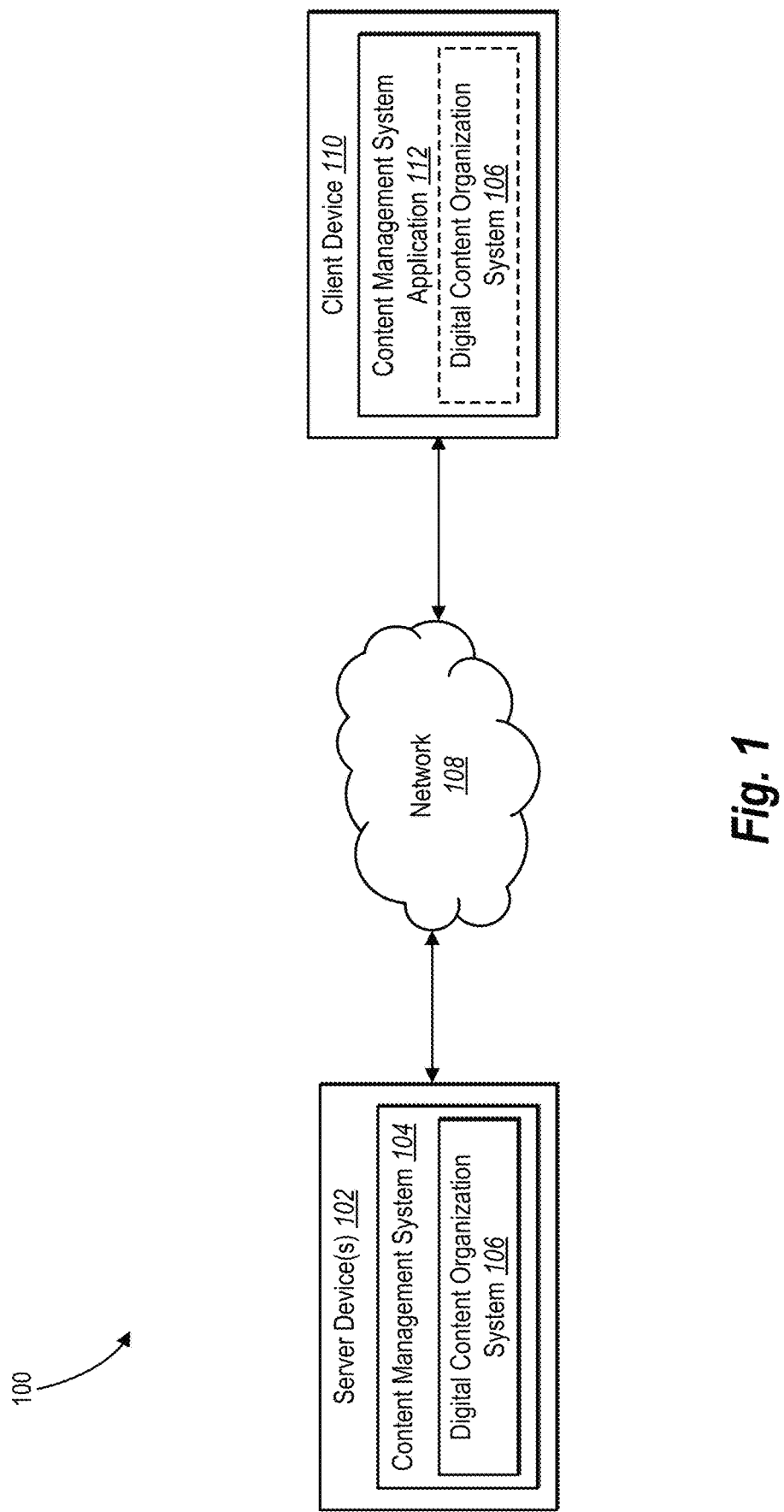
FIG. 1 illustrates a schematic diagram of an example system in which a digital content organization system operates in accordance with one or more implementations.

This disclosure describes one or more embodiments of a digital content organization system that creates a collection of video segments from unorganized video files to organize the video segments by scene types. In particular, the digital content organization system identifies scenes across segments of video files and groups and displays the video segments from the video files as collections organized by scene types. For instance, the digital content organization system can identify scene types and video files. Subsequently, the digital content organization system can determine mappings between various video segments from the video files and the scene types. Moreover, the digital content organization system can provide, for display within a graphical user interface (GUI), the content of the video files as collection objects that portray video segments grouped by scene type.

As an illustrative example, the digital content organization system can receive video files that portray a wedding (e.g., captured from multiple camera devices and/or captured in multiple video files). Unlike many existing systems that require a user to review hours of footage (from the video files) to identify video footage from the video files that relate to (or portray) different scenes (e.g., cake cutting, ring ceremony, vows), the digital content organization system utilizes machine learning to identify video segments from the video files that map to (e.g., are relevant to) one or more scene types (e.g., cake cutting, ring ceremony, vows). Subsequently, the digital content organization system can provide, for display within a GUI, the video segments grouped (e.g., as collection objects) under different scene types (e.g., a first set of video segments from the video files that portray a cake cutting scene and a second set of video segments from the video files that portray a ring ceremony scene).

In one or more embodiments, the digital content organization system identifies scene types. For instance, the digital content organization system can identify one or more scene types that belong to a particular theme (e.g., weddings, sports event, instructional videos). In some cases, the digital content organization system can represent scene types as text labels that describe a particular scene (e.g., cake cutting, vows, ring ceremony). In addition, the digital content organization system can also identify (or assign) one or more additional keywords to a particular scene type (e.g., cake cutting can include keywords, such as cake, knife, candle, icing). In some implementations, the digital content organization system identifies user created scene types by receiving user input text that represents the scene types.

Furthermore, in one or more embodiments, the digital content organization system can identify various media content files. In some cases, the digital content organization system can identify one or more media content files uploaded from a user client device and/or stored on the user client device. Additionally, the digital content organization system can identify various combinations of video files and/or image files as the media content files. In some instances, the digital content organization system segments the media content files (e.g., video files) into a set of video segments (e.g., based on detected scene changes within frames of the video files).

Additionally, the digital content organization system can determine mappings between the set of video segments and the scene types. For instance, in one or more embodiments, the digital content organization system utilizes a machine learning model to determine mappings between the set of video segments to one or more of the scene types using video and/or transcript data from the video files. In particular, the digital content organization system can generate word vector embeddings from the video and/or transcript data of the video segments and additional word vector embeddings for the scene types. Indeed, the digital content organization system can further utilize relevancies between the word vector embeddings to map video segments from the set of video segments to the scene types.

In some cases, to map a video segment to a scene type, the digital content organization system can utilize image classification with the frames from the video segment to determine various classifications for the video segment and further convert the classifications into word vector embeddings. In addition, in some implementations, the digital content organization system can also generate word vector embeddings from a transcript corresponding to the video segment. Furthermore, the digital content organization system can compare the word vector embeddings (from the image classifications and/or the transcript) to one or more word vector embeddings of the scene types to determine relevance scores between the scene types and the video segment. Indeed, using the relevance scores, the digital content organization system can assign scene types to the video segment. In one or more embodiments, the digital content organization system, using the above-mentioned approach, assigns various scene types to various video segments from the video files (e.g., to group the video segments by the scene types).

Upon determining the mappings between the video segments and scene types, the digital content organization system can provide, for display within graphical user interfaces, collection objects that portray various video segments from the video files grouped according to scene types. Indeed, in one or more embodiments, the digital content organization system can utilize reference markers to identify and display the video segments (e.g., as playable videos) grouped by scene type. In some cases, the digital content organization system can generate additional video files corresponding to the video segments and store the additional video files in relation to mapped scene types. In one or more implementations, the digital content organization system 106 can generate a new video file (e.g., as a short video that includes each scene from multiple video files) that utilizes video segments from various scene types. Furthermore, in some implementations, the digital content organization system can also export the video segments grouped by the scene types to various media content editing applications (e.g., to enable editing of the video segments according to scene type).

The digital content organization system provides several technical advantages over existing document hosting systems. For instance, the digital content organization system improves upon the flexibility of graphical user interfaces of existing systems by generating (and displaying) collection objects that display media (or video) segments from (multiple) media (or video) files organized by scene type. For example, in contrast to existing systems that simply list video files and video file names, the digital content organization system robustly breaks up large and/or multiple video files into discernible scenes to enable editing, viewing, and/or organizing of video footage (e.g., video segments) within video files within a graphical user interface (for file management).

In addition to providing robust and flexible presentations of media content organized by detected scene types, the digital content organization system also improves the ease of use of media file management. For example, unlike many existing systems that display GUIs that are often difficult and time consuming to view and organize a large number of media (or video) files for specific content, the digital content organization system can enable easy access to media content within large and/or multiple media files. For example, the digital content organization system can organize large and/or multiple video files into discernible scene types to enable quick viewing of video files by scene types (e.g., without requiring the excessive time to scan through and view video footage in the video files).

Furthermore, the digital content organization system also improves the efficiency of media file management. To illustrate, in contrast to many existing systems that require excessive user navigation to identify scenes within media files and organize the media files, the digital content organization system automatically detects scene types in various media content (or video) segments of media (or video) files to organize large and/or multiple media (or video) files into discernible scene types. Indeed, the digital content organization system can enable users to view, organize, and/or edit video segments that are specific to a scene type without excessive user navigation (and the associated computational resources) to identify specific scenes within the video files by using video play back to view the video files. Accordingly, the digital content organization system can enable a media file management GUI to ingest large and/or multiple video files and organize various portions of the video files into discernible scene types to enable efficient navigation of the different scene types and different video footage collections within limited screen spaces of mobile devices.

In addition, in some cases, the digital content organization system also improves the speed of analyzing and organizing various video files into video segments by scene type. For instance, in some cases, during an upload of video files, the digital content organization system can first upload video file proxies (e.g., low resolution versions of the video files) to utilize machine learning to determine mappings between video segments from the video files and one or more identified scene types while the video files complete uploading into a repository of the digital content organization system. Indeed, by doing so, the digital content organization system can increase the speed of analyzing and organizing the video files into video segments grouped by scene type (e.g., the video files are organized by scene type before and/or while the full-size video files complete uploading and/or storing on As illustrated by the foregoing discussion, the present disclosure utilizes a variety of terms to describe features and benefits of the file organization system. Additional detail is now provided regarding the meaning of these terms. As used herein, the term "media content" (or sometimes referred to as "media content file" or "digital content") refers to discrete data representation of a document, file, image, or video. In particular, a digital content item can include, but is not limited to, a digital image (file), a digital video (file), an electronic document (e.g., text file, spreadsheet, PDF, forms), and/or electronic communication.

As further used herein, the term "video file" refers to discrete data representation of a visual representation of multiple frames (or images). For example, a video file can include, but is not limited to, a digital file with the following file extensions: AVI, WMV, MOV, QT, MP4, or AVCHD. Furthermore, as used herein, the term "video segment" refers to a portion or subset of frames from a video file (e.g., the subset of frames represents or depicts a portion of a video portrayed in the video file).

As used herein, the term "video data" refers to data that represents visual and/or auditory aspects of content. For instance, video data can include a set of video frames that are represented using a set of digital images. In addition, video data can include audio data (e.g., an audio track) that represents one or more sounds corresponding to the video frames of the video data. For instance, the digital content organization system 106 can utilize a set of images (e.g., image frames) and/or audio data from the video data to playback a video (e.g., moving visual images with a sound recording associated with the moving visual images).

As used herein, the term "transcript" (or sometimes referred to as "transcript data") refers to a text (e.g., a string of text or a text document) that represents words dictated or recorded in audio data of a video file. For instance, a transcript includes a set of text corresponding to a video file to represent words and/or other sounds depicted by audio data in a video file at various timestamps. In some cases, the digital content organization system identifies a transcript as a text file or text data corresponding to a video file and/or generates a transcript utilizing audio data analysis (e.g., using automated transcription approaches) in relation to the video data. In some instances, the digital content organization system 106 utilizes an audio data analysis such as, but not limited to, automatic speech recognition that utilizes neural networks to analyze the audio data and/or Hidden Markov models to analyze the audio data. In some cases, the digital content organization system 106 utilizes entity extraction to label noun phrases along with description of the noun phrases (e.g., person or location, organization) from the transcript to determine the transcript data utilized in determining mappings between video segments and scene types.

Moreover, as used herein, the term "scene" refers to a portion or sequence of visual representation that represents a particular topic (e.g., place, action, object). In particular, the term "scene" can refer to a portion or sequence within a video that portrays a specific place, action, or object. To illustrate, a scene can include actions, such as, but not limited to, "cake cutting," "vows," "home runs," and/or "dancing." In addition, a scene can also include places and/or objects, such as, but not limited to, "reception," "stadium," "shoes," and/or "socks."

In addition, as used herein, the term "scene type" refers to a category or label that represents a scene. In particular, the term "scene type" refers to a data representation that indicates or represents a scene. In one or more implementations, the digital content organization system utilizes text labels for the scene types (e.g., system created and/or user created text labels). For example, as used herein, the term "text label" refers to text or term that classifies or names a particular scene type. For instance, the digital content organization system can utilize text labels, such as, but not limited to, "cake cutting," "vows," "home runs," "dancing," "reception," "shoes," "running," "jumping," "red," "music," and/or "dancing" to represent scene types. Indeed, a scene type can include various nouns, verbs, and/or adjectives.

Additionally, in one or more implementations, the digital content organization system can further associate one or more keywords with a text label of a scene type. As used herein, the term "keyword" refers to text or term that describes or indicates content related to information retrieval and/or a query. For instance, the digital content organization system can, for a scene type of "cake cutting" utilize keywords, such as, but not limited to, "cake," "frosting," "candles," and/or "knife" to further describe or indicate content related to the scene type of "cake cutting."

As used herein, the term "machine learning model" refers to a computer representation that can be tuned (e.g., trained) based on inputs to approximate unknown functions. For instance, a machine-learning model can include, but is not limited to, a differentiable function approximator, a contrastive language-image pre-training model, a neural network (e.g., a convolutional neural network, deep learning model, recurrent neural network, generative adversarial neural network), a decision tree (e.g., a gradient boosted decision tree), a linear regression model, a logistic regression model, a clustering model, association rule learning, inductive logic programming, support vector learning, Bayesian network, regression-based model, principal component analysis, or a combination thereof. In some instances, a machine learning model can be adjusted or trained to determine mappings between media content (e.g., or portions of media content) and one or more scene types.

As further used herein, the term "image classifier" refers to a machine learning model that can be tuned (e.g., trained) to analyze images (or video frames) to determine classifications for the content portrayed within the images (or video frames). For instance, an image classifier can determine classifications for content portrayed within the images (or video frames), such as, but not limited to, places, objects, actions, emotions, people, mood, camera angles, vibe, energy level, image quality, perspective, and/or landscape versus portrait. In one or more embodiments, the digital content organization system utilizes various image classifiers, such as, but not limited to, convolution neural network-based image classifiers and/or recurrent neural network-based image classifiers.

As used herein, the term "text encoder" refers to a machine learning model that can be tuned (e.g., trained) to analyze text to determine vector embeddings. For example, the term "text encoder" can refer to a machine learning model that analyzes text, classification labels, and/or scene type labels to generate word vector embeddings that represent the text, classification labels, and/or scene type labels within an embedded space. In one or more embodiments, the digital content organization system utilizes text encoders, such as, but not limited to, Term Frequency Inverse Document Frequency (TF-IDF) encoders, Word2Vec, matrix factorization vector learning approaches, local context window vector learning approaches, Global Vectors for Word Representation (GloVe), Bidirectional Encoder Representations from Transformers, and/or natural language processing approaches (e.g., spaCy) to generate word vector embeddings from text, classification labels, and/or scene type labels.

Furthermore, as used herein, the term "word vector" (sometimes referred to as "word vector embedding") refers to a set of values that represent characteristics (or features) of text. For example, the term "word vector" refers to a set of values that represent latent and/or patent attributes of text. In one or more embodiments, the digital content organization system can utilize word vector embeddings (generated from text, classification labels, and/or scene type labels) to determine relationships and/or connections between the text, classification labels, and/or scene type labels (e.g., utilizing distance similarities, feature similarities).

As used herein, the term "collection object" refers to a discrete data representation of an organizational grouping of media content items (and/or other data). For instance, the term "collection object" can refer to a visual object that portrays a grouping of media content items (and/or other data) according to a category (e.g., a scene type). In some instances, the digital content organization system utilizes various representations for a collection object, such as, but not limited to, a subsection of a GUI that includes video segments for a particular scene type, a folder that includes video segments for a particular scene type, and/or a stacked icon of multiple video segments for a particular scene type. In one or more instances, the digital content organization system utilizes a collection object that includes stored files for the video segments and/or references to the video segments from a set of video files in a repository of the digital content organization system.

Additionally, as used herein, the term "folder" refers to a discrete data representation of an organizational grouping of digital content items, folders, or other data or a directory that contains references to digital content item files and their locations in a file storage structure. In particular, a folder can include a cataloging structure that includes other folders (or directories) and/or electronic files that represent data for digital content items. Furthermore, as used herein, the term "folder icon" refers to a graphical user interface element or graphic that depicts or represents a folder. Furthermore, the folder icon can be associated with options to open, preview, move, delete, remove, rename, locate a folder within a file storage structure, and/or locate (or pinpoint) digital content items contained within the folder corresponding to the folder icon.

As further used herein, the term "reference marker" refers to pointer data that represents a video file, one or more time stamps, and/or a scene type to represent a video segment from the video file in relation to a scene type. In one or more embodiments, the digital content organization system utilizes reference markers to indicate video segments within video files and determined scene types for the video segments. In particular, the digital content organization system can utilize a reference marker to point to a video segment within a video file to display the video segment within a collection object or other GUI element without creating additional files for the video segment.

Turning now to the figures, FIG. 1 illustrates a schematic diagram of one implementation of a system 100 (or environment) in which a digital content organization system 106 operates in accordance with one or more implementations. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a content management system 104, which further includes the digital content organization system 106. In particular, the content management system 104 provides functionality by which a user (not shown in FIG. 1) can use the client device 110 to generate, manage, and/or store digital content. For example, a user can generate new digital content using the client device 110. Subsequently, a user utilizes the client device 110 to send the digital content to the content management system 104 hosted on the server device(s) 102 via the network 108. The content management system 104 can then provide many options that the client device 110 may utilize (and a user selects or otherwise interacts with) to store the digital content, organize the digital content, share the digital content, and subsequently search for, access, view, and/or modify the digital content. Additional detail regarding the content management system 104 is provided below (e.g., in relation to FIG. 13 and the content management system 1302). Furthermore, the server device(s) 102 can include, but are not limited to, a computing (or computer) device (as explained below with reference to FIG. 12).

As further shown in FIG. 1, the system 100 includes the client device 110. In one or more implementations, the client device 110 include, but are not limited to, mobile devices (e.g., smartphones, tablets), laptops, desktops, or other types of computing devices, as explained below with reference to FIG. 12. For example, the client device 110 can be operated by users to perform various functions (e.g., via the content management system application 112) such as, but not limited to, creating, receiving, viewing, modifying, and/or transmitting digital content, configuring user account or application settings of the content management system 104, and/or electronically communicating with other user accounts of the content management system 104.

To access the functionalities of the content management system 104 (and the digital content organization system 106), a user can interact with the content management system application 112 via the client device 110. The content management system application 112 can include one or more software applications installed on the client device 110. In some implementations, the content management system application 112 can include one or more software applications that are downloaded and installed on the client device 110 to include an implementation of the digital content organization system 106. In some embodiments, the content management system application 112 is hosted on the server device(s) 102 and is accessed by the client device 110 through a web browser and/or another online platform. Moreover, the content management system application 112 can include functionalities to access or modify a file storage structure stored locally on the client device 110 and/or hosted on the server device(s) 102. Although FIG. 1 illustrates a single client device 110, in one or more embodiments, the system 100 can include various numbers and types of client devices.

As just mentioned, in some embodiments, the server device(s) 102 include the digital content organization system 106 (through the content management system 104). In one or more embodiments, the digital content organization system 106 receives media content files (e.g., video files) from the client device 110. Moreover, the digital content organization system 106 can create a collection of media content segments from the received media content files to organize the media content segments by scene types (for display within a GUI of the client device 110) in accordance with one or more implementations described herein.

Although FIG. 1 illustrates the digital content organization system 106 being implemented by a particular component and/or device within the system 100 (e.g., the server device(s) 102), in some embodiments, the digital content organization system 106 is implemented, in whole or part, by other computing devices and/or components in the system 100. For example, in some implementations, the digital content organization system 106 is implemented on the client device 110 within the content management system application 112. More specifically, in some embodiments, some or all of the digital content organization system 106 is implemented by the server device(s) 102 and accessed by the client device 110 through the content management system application 112, web browsers, and/or other online platforms (as described above). In some instances, some or all of the digital content organization system 106 is implemented by the client device 110 on the content management system application 112 and communicates data (or changes to data) to the content management system 104 on the server device(s) 102.

Additionally, as illustrated in FIG. 1, the system 100 includes the network 108 that enables communication between components of the system 100. In certain implementations, the network 108 includes a suitable network and may communicate using any communication platforms and technologies suitable for transporting data and/or communication signals between the server device(s) 102 and the client device 110. An example of the network 108 is described with reference to FIG. 12 and/or FIG. 13. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2A:
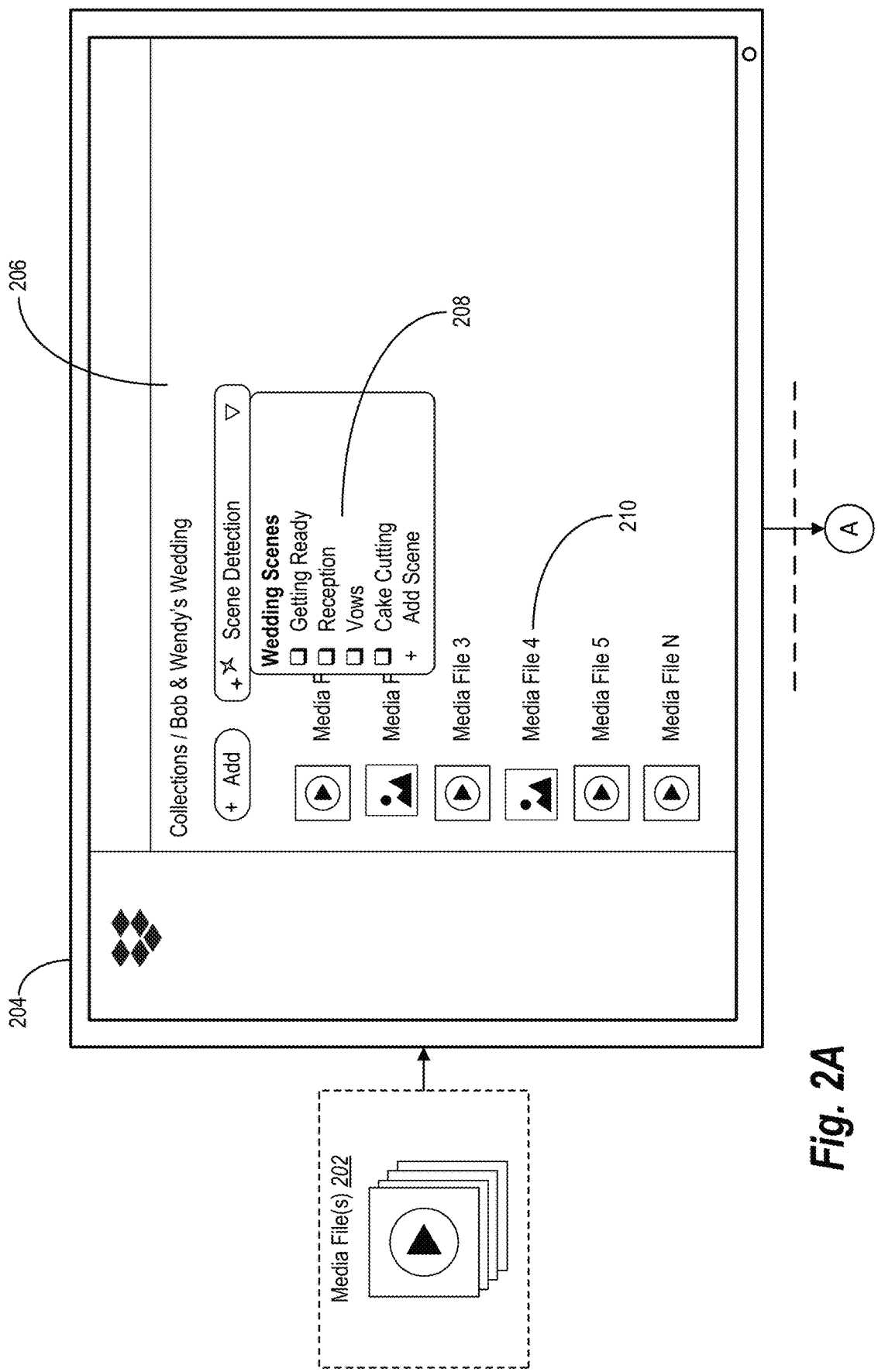
FIGS. 2A-2B illustrate an exemplary flow of the digital content organization system organizing media segments from media content files by scene types in accordance with one or more implementations.
Figure 2B:
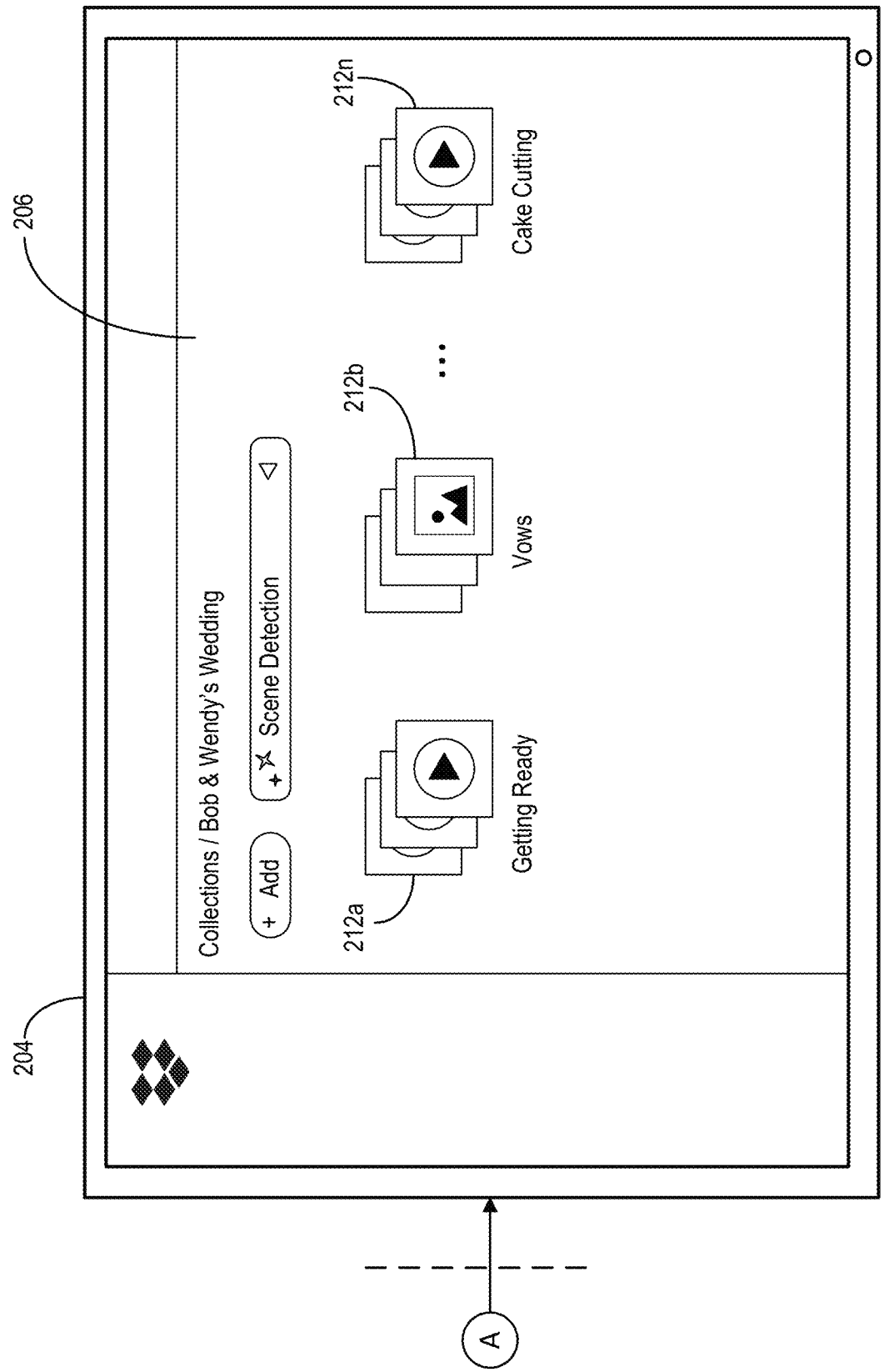

As mentioned above, the digital content organization system 106 intelligently and automatically detects scene types across various portions of media content and displays collections that organize segments (or portions) of media content (e.g., videos or images) according to the detected scene types for the media content files. To illustrate, FIGS. 2A-2B illustrate an exemplary flow of the digital content organization system 106. In particular, FIGS. 2A-2B illustrate the digital content organization system 106 creating a collection of media segments from media content files to organize the media segments by scene types.

As shown in FIG. 2A, the digital content organization system 106 receives (or identifies) media file(s) 202. Moreover, as illustrated in FIG. 2A, the digital content organization system 106 provides, for display within a graphical user interface 206 of a client device 204, a list 210 of the media file(s) 202 (e.g., as a listing of files and file names). Moreover, as further shown in FIG. 2A, the digital content organization system 106 identifies (or detects) user selections of one or more scene types from the scene type selection menu 208 (e.g., "Getting Ready," "Reception," "Vows," and "Cake Cutting" under a "Wedding Scenes" theme) within the graphical user interface 206.

Furthermore, upon receiving a selection of the scene types from the scene type selection menu 208, the digital content organization system 106 can create a collection of media segments from media files in the list 210 to organize the media segments by the selected scene types. For instance, as shown in the transition from FIG. 2A to FIG. 2B, the digital content organization system 106 determines mappings between media content segments of the media files in the list 210 and scene types selected from the scene type selection menu 208 to generate and display the collection objects 212a-212n within the graphical user interface 206 of the client device 204. Indeed, as shown in FIG. 2B, the digital content organization system 106 displays the collection objects 212a-212n, within the graphical user interface 206, to portray media segments from the media files grouped by the scene type portrayed in the content of the media segments (e.g., "Getting Ready," "Vows," "Cake Cutting").

Figure 3:
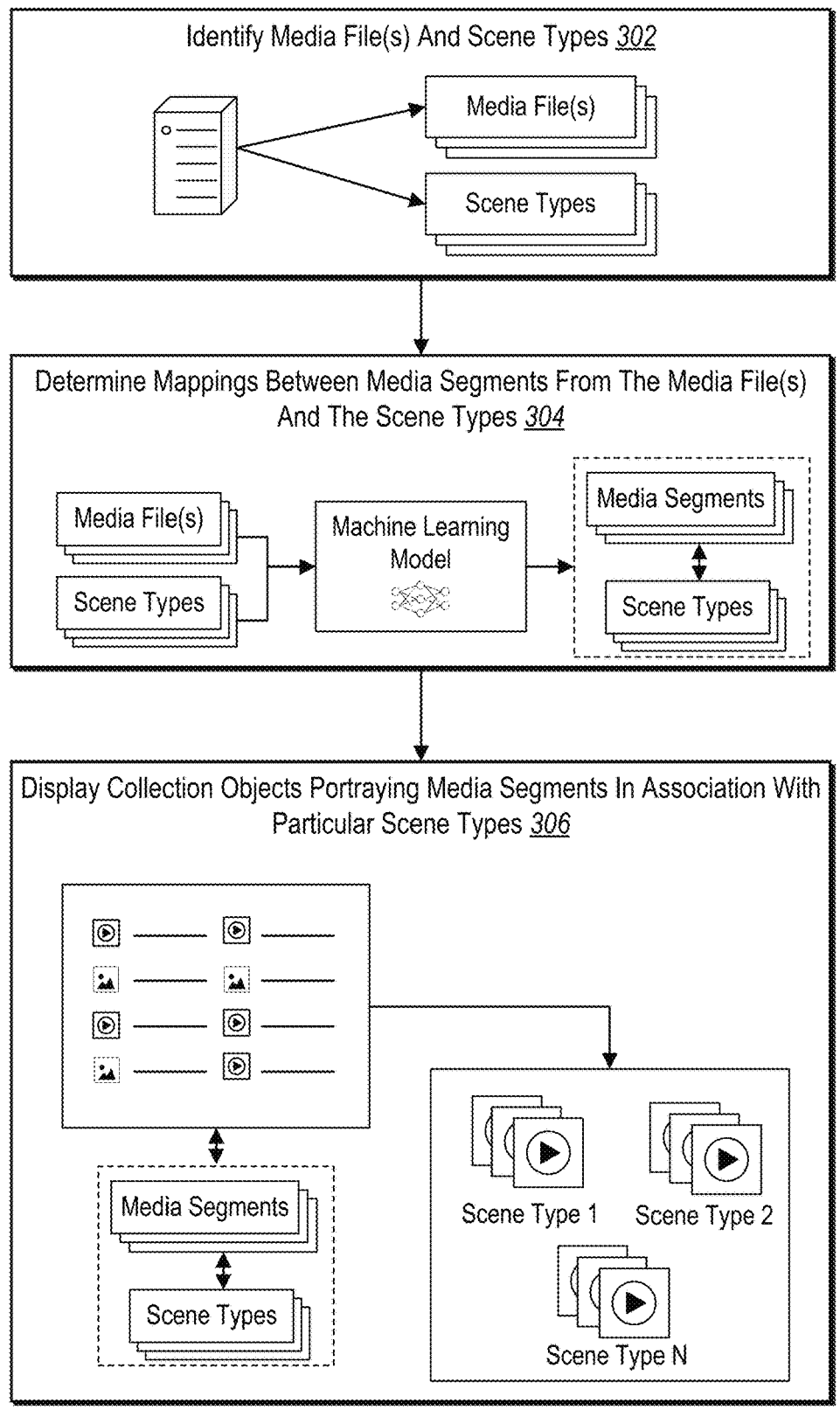
FIG. 3 illustrates an overview of a digital content organization system detecting scene types across various portions of media content and organizing segments (or portions) of media content according to the detected scene types in accordance with one or more implementations.

Moreover, FIG. 3 illustrates an overview of the digital content organization system 106 intelligently and automatically detecting scene types across various portions of media content and displaying collections that organize segments (or portions) of media content (e.g., videos or images) according to the detected scene types for the media content files. In particular, FIG. 3 illustrates the digital content organization system 106 identifying media file(s) and scene types, determining mappings between media segments from the media files and the scene types, and displaying collection objects portraying the media segments in associated with particular scene types.

As shown in act 302 of FIG. 3, the digital content organization system 106 identifies media file(s) and scene types. In particular, the digital content organization system 106 can receive media file(s) and segment the media file(s) into various segments (from a client device). Furthermore, the digital content organization system 106 can identify one or more scene types (as text labels) that belong to a particular theme from a user selection (or via user created text labels). Indeed, the digital content organization system 106 can identify media file(s) (e.g., such as video files) and scene types as described below (e.g., in relation to FIGS. 4 and 5).

Additionally, as shown in act 304 of FIG. 3, the digital content organization system 106 determines mappings between media segments from the media file(s) and the scene types. For instance, as shown in the act 304, the digital content organization system 106 utilizes a machine learning model to determine mappings between the media segments, corresponding to one or more media files, and one or more of the scene types. As shown in the act 304, the digital content organization system 106 can assign various scene types to one or more groupings of media segments. Indeed, the digital content organization system 106 can determine mappings between the media segments, corresponding to one or more media files, and one or more scene types as described below (e.g., in relation to FIG. 6).

Furthermore, as shown in act 306 of FIG. 3, the digital content organization system 106 displays collection objects portraying media segments in association with particular scene types. As shown in the act 306, the digital content organization system 106 can organize a set of media files into collection objects that portray various media segments from the media files grouped according to scene types. In one or more embodiments, the digital content organization system 106 enables various GUIs, file storage functionalities, and/or exporting options using the collection objects that portray various media segments from the media files grouped according to scene types. Indeed, the digital content organization system 106 can enables various GUIs, file storage functionalities, and/or exporting options using the collection objects that portray various media segments from the media files grouped according to scene types as described below (e.g., in relation to FIGS. 7-10).

As shown in FIGS. 2A, 2B, and 3, the digital content organization system 106 can create a collection of media segments from media content files to organize the media segments by scene types for various media file types. For example, the digital content organization system 106 can create a collection of video segments from video files to organize the video segments by scene types. In some cases, the digital content organization system 106 can create a collection of images from image files to organize the images by scene types. Additionally, in one or more embodiments, the digital content organization system 106 can create a combined collection of video segments from video files and images from image files to organize a combination of video segments and images by scene types. Although the following FIGS. 4-10 illustrate the digital content organization system 106 create a collection of video segments from video files to organize the video segments by scene types, the embodiments of FIGS. 4-10 can be utilized to create a collection of media segments from media content files to organize the media segments by scene types for various media file types (as described above).

Figure 4:
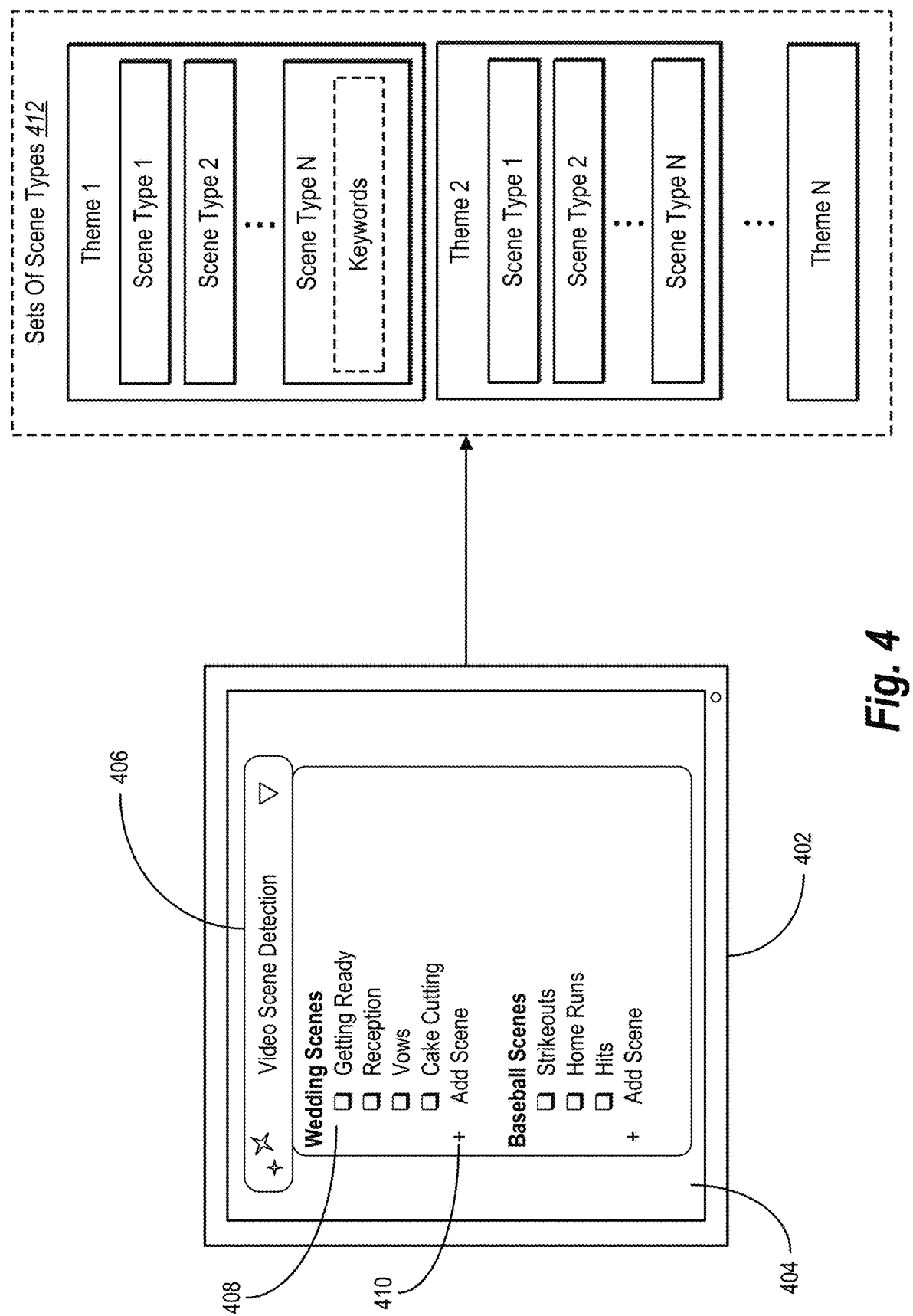
FIG. 4 illustrates a digital content organization system identifying scene types to utilize in organizing video segments in accordance with one or more implementations.

As mentioned above, the digital content organization system 106 can identify scene types to utilize in organizing video segments from one or more video files. As an example, FIG. 4 illustrates the digital content organization system 106 identifying scene types to utilize in organizing video segments from one or more video files according to the identified scene types. For instance, as shown in FIG. 4, the digital content organization system 106 provides, for display within a graphical user interface 404 of a client device 402, a scene type selection menu 406. As illustrated in FIG. 4, the displayed scene type selection menu 406 displays selectable scene types 408 for various themes (e.g., "Wedding Scenes" and "Baseball Scenes"). As further shown in FIG. 4, the digital content organization system 106 utilizes selections and/or user interactions within the scene type selection menu 406 to create sets of scene types 412 that include scene types for various themes (e.g., theme 1 through theme N). In addition, as shown in FIG. 4, the digital content organization system 106 can also identify keywords (e.g., based on user selection and/or system detection) for particular scene types within the sets of scene types 412.

In some instances, the digital content organization system 106 can receive user created scene types. For instance, as shown in FIG. 4, the digital content organization system 106 can receive a user interaction with a selectable option 410 to add a scene type. Upon detecting a user interaction with the selectable option 410, the digital content organization system 106 can enable an input of a text label (e.g., via a text input element) for a scene type and add the text label as a scene type (e.g., a new scene type, such as Ring Ceremony) to the corresponding theme (e.g., Wedding Scenes). In addition, the digital content organization system 106 can add the received text label within the sets of scene types 412.

Furthermore, upon receiving a selection of one or more scene types from the selectable scene types 408 within the scene type selection menu 406, the digital content organization system 106 utilizes the selected scene types as the set of scene types to utilize in organizing video segments from one or more video files. In particular, the digital content organization system 106 can utilize selected scene types (from the selectable scene types 408) to organizing video segments from one or more video files as groupings for the selected scene types (as described below). In addition, in one or more embodiments, the digital content organization system 106 updates the scene type selection menu 406 to illustrate the selected scene types as selected (e.g., via check marks, changing display style, bold font, filled in radio buttons) within selectable scene types 408.

In some embodiments, the digital content organization system 106 determines and provides, for display, one or more scene types for one or more themes (e.g., as default scene types and themes). For instance, the digital content organization system 106 can utilize predefined scene types and themes (e.g., received from an administrator device) as default scene types and themes. For example, the digital content organization system 106 can provide, for display within a graphical user interface, one or more default sets of scene types created from user input on an administrator device. Additionally, the digital content organization system 106 can also utilize predefined keywords for the scene types.

In some cases, the digital content organization system 106 receives user created scene types, themes, and/or keywords. For instance, the digital content organization system 106 can receive, from a client device, a user created theme for a user account corresponding to the client device. In addition, the digital content organization system 106 can receive, from the client device, one or more scene types via text labels (for a new theme or as additions to an existing theme). Additionally, the digital content organization system 106 can also receive, from the client device, one or more keywords for the scene types. As an example, the digital content organization system 106 can receive various user created themes, scene types, and/or keywords from a client device, such as, but not limited to, scene types specific to instructional videos created by a user (e.g., for a particular hobby or profession) and/or scene types for various events (e.g., basketball games, dance recitals).

In one or more embodiments, the digital content organization system 106 automatically generates themes, scene types, and/or keywords. For instance, the digital content organization system 106 can utilize web searches and/or scraping to identify themes, scenes associated with the themes, and/or keywords (e.g., from websites, informational web articles for various events). In some cases, the digital content organization system 106 can utilize file structure data from various users to generate themes, scene types, and/or keywords from parent and child folder structures (e.g., a parent folder named Baseball with child folders named strikeouts, home runs, hits).

In some instances, the digital content organization system 106 can utilize media content analysis to determine themes, scene types, and/or keywords. For example, the digital content organization system 106 can analyze video data and/or transcript data from multiple video files to identify themes, scene types, and/or keywords. Indeed, in some instances, the digital content organization system 106 can analyze video data and/or transcript data to determine classifications and/or frequently utilized words as the scene types, themes, and/or keywords.

Moreover, although FIG. 4 illustrates the digital content organization system 106 providing selectable scene types and/or other scene type options via a dropdown menu, the digital content organization system 106 can utilize various UI elements for options corresponding to the scene types, themes, and/or keywords. For instance, the digital content organization system 106 can utilize UI elements, such as, but not limited to, text input boxes, radio buttons, click and drag UI elements, and/or toggles.

Figure 5:
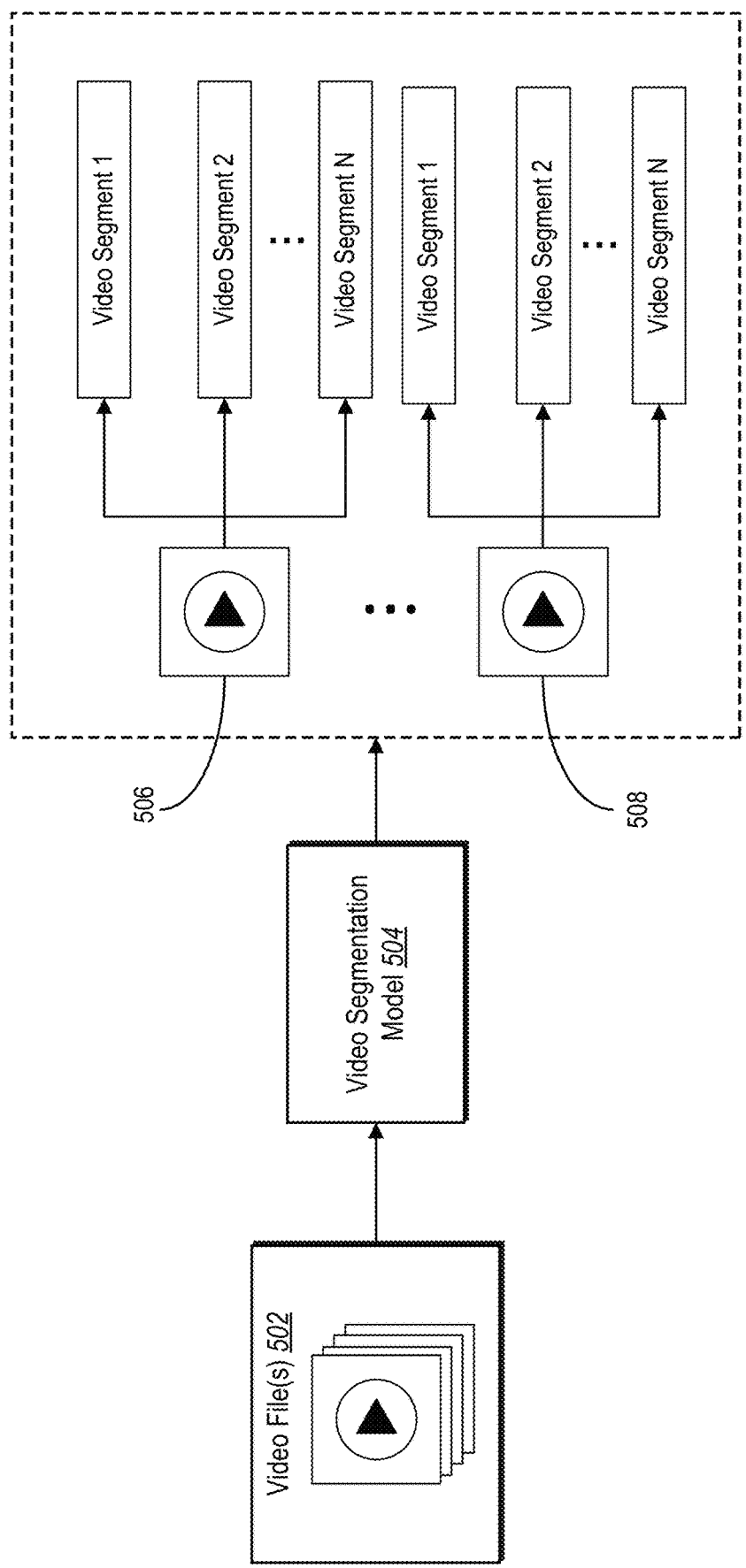
FIG. 5 illustrates a digital content organization system segmenting video files into various video segments in accordance with one or more implementations.

As mentioned above, in some implementations, the digital content organization system 106 identifies video files and segments video files into video segments. For instance, FIG. 5 illustrates the digital content organization system 106 segmenting video files into various video segments. To illustrate, as shown in FIG. 5, the digital content organization system 106 receives video file(s) 502. Then, as further shown in FIG. 5, the digital content organization system 106 utilizes the video file(s) 502 with a video segmentation model 504 to output (or generate) a set of video segments for the video file(s) 502. Furthermore, as shown in FIG. 5, the digital content organization system 106 generates video segments 1-N for a video file 506 and also generates video segments 1-N for a video file 508. Indeed, the digital content organization system 106 can generate various numbers of video segments for various numbers of video files.

In some implementations, the digital content organization system 106 utilizes a video segmentation model that identifies scene changes between frames of video files to generate video segments. In particular, the digital content organization system 106 analyzes the frames of a video file to determine one or more scene changes between the frames (e.g., indicated by changes of visual characteristics of the frames, changes of settings in the frames, change of persons depicted within the frames). Moreover, the digital content organization system 106 divides or marks a video file at the frames where a scene change is identified. Indeed, the digital content organization system 106 can utilize the marked frames as a reference to generate various video segments from a video file (e.g., to obtain video segments that depict or portray different content from the video file).

In some instances, the digital content organization system 106 utilizes a video segmentation model that uses a threshold scene change value to generate video segments. For instance, the digital content organization system 106 determines (or calculates) a score or value for an amount of visual change between frames (e.g., a feature or content similarity score). Then, the digital content organization system 106 compares the visual change score or value to the threshold scene change value to determine whether the frame transition depicts a change of scene and/or content in the video file. For example, upon satisfying the threshold scene change value for a frame, the digital content organization system 106 can divide or mark a video file at the particular frame to generate a video segment.

In some embodiments, the digital content organization system 106 generates video segments for a video file by utilizing a video segmentation model that uses a number of frames and/or time. For example, in some cases, the digital content organization system 106 determines a number of frames (60 frames, 1000 frames) and/or an amount of time (e.g., every 1 second, 5 seconds, 10 seconds, 1 minute) and divides a video content of a video file by the number of frames and/or amount of time to generate the video segments. Furthermore, in some instances, the digital content organization system 106 utilizes a randomized number of frames and/or an amount of time to divide video content into video segments.

Furthermore, the digital content organization system 106 can determine scene types for the various video segments (in accordance with one or more embodiments herein) and merge adjacent video segments that belong to the same scene type. For instance, in one or more embodiments, the digital content organization system 106 determines that a first and second video segment are adjacent within a video. Moreover, the digital content organization system 106 can determine a mapping to the same scene type for the first and second adjacent video segments. Upon determining the same scene type for the adjacent video segments, the digital content organization system 106 can merge the first and second adjacent video segments for the scene type (e.g., within a collection object for the scene type).

As previously mentioned, the digital content organization system 106 can determine mappings between video segments and scene types. For example, in one or more embodiments, the digital content organization system 106 utilizes a machine learning model to determine mappings between the set of video segments to one or more of the scene types using video and/or transcript data from the video files. In particular, the digital content organization system 106 can utilize a machine learning model to determine relevancies between scene types and video and/or transcript data from video segments of the video files.

Figure 6:
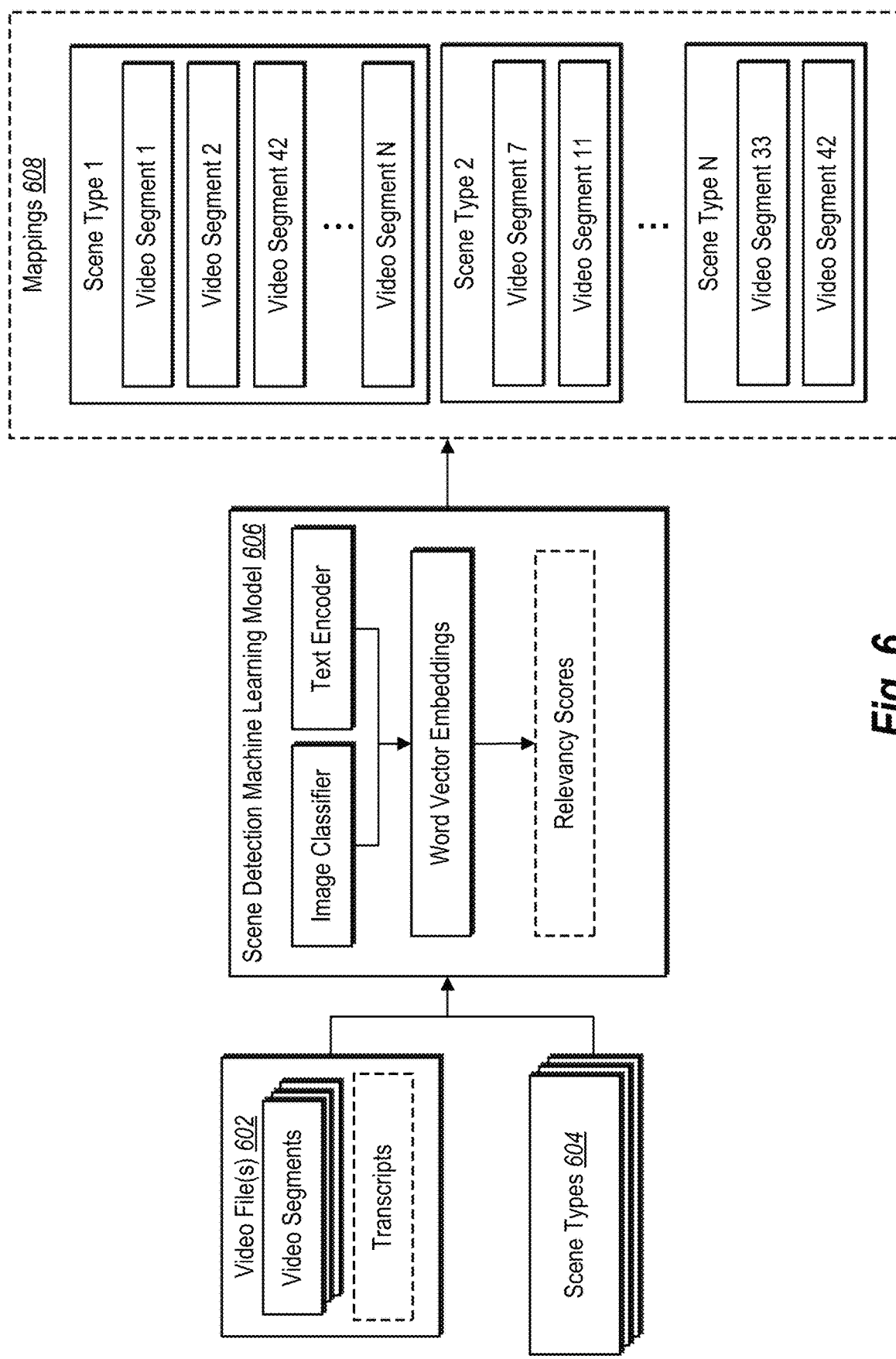
FIG. 6 illustrates a digital content organization system determining mappings between video segments and scene types utilizing a machine learning model in accordance with one or more implementations.

For instance, FIG. 6 illustrates the digital content organization system 106 determining mappings between video segments and scene types utilizing a machine learning model. As shown in FIG. 6, the digital content organization system 106 provides video segments (and/or transcripts) from video file(s) 602 and scene types 604 to a scene detection machine learning model 606. Then, as shown in FIG. 6, the digital content organization system 106 utilizes the scene detection machine learning model 606 to determine mappings 608 between the video segments from the video file(s) 602 and the scene types 604.

In particular, as shown in FIG. 6, the digital content organization system 106 can utilize an image classifier and a text encoder to generate word vector embeddings from the video segments (and/or transcripts) from the video file(s) 602. In addition, as illustrated in FIG. 6, the digital content organization system 106 can also generate word vector embeddings for the scene types 604 (e.g., as text label queries). Then, in reference to FIG. 6, the digital content organization system 106 can utilize the word vector embeddings (e.g., via comparison) to generate relevancy scores between the video segments and the scene types (that are represented by the word vector embeddings). Indeed, as shown in FIG. 6, the digital content organization system 106 generates the mappings 608 (e.g., mapping various video segments from the video file(s) 602 to scene types) based on the relevancy scores between the video segments and the scene types.

As further shown in FIG. 6, in some embodiments, the digital content organization system 106 can map a video segment to multiple scene types. For instance, as shown in the mappings 608, the digital content organization system 106 can map a video segment 42 to both scene type 1 and scene type N. Indeed, the digital content organization system 106 can utilize relevancy scores between the video segments and the scene types to map a video segment to various numbers of scene types.

In some implementations, the digital content organization system 106 determines mappings between video segments and scene types utilizing image classification of video data and the scene types. For instance, the digital content organization system 106 can utilize an image classifier to analyze frames of a video segment to output one or more classifications (e.g., a portrayed object, action, emotion, color, persons, faces) for the frames of the video segments. Then, the digital content organization system 106 can utilize a text encoder to generate word vector embeddings from the output classifications of the image classifier. Indeed, the digital content organization system 106 can utilize a text encoder (as described above) to generate (or convert) the image classifications to word vector embeddings In addition, in one or more embodiments, the digital content organization system 106 further converts one or more text labels for scene types (and/or keywords associated with the scene types) to word vector embeddings utilizing the text encoder. In particular, the digital content organization system 106 can convert the one or more text labels for the scene types (and/or the keywords associated with the scene types) to word vector embeddings in the same embedding space as the word vector embeddings for the output classifications of the image classifier. Indeed, the digital content organization system 106 can utilize a text encoder (as described above) to generate (or convert) the scene types and/or associated keywords to word vector embeddings.

In some implementations, the digital content organization system 106 utilizes the word vector embeddings from the image classifications and the word vector embeddings from the scene types and/or associated keywords to determine mappings between a video segment and one or more scene types. In particular, the digital content organization system 106 can compare the word vector embeddings of both the image classifications and the scene types and/or associated keywords to determine relevancies (or relevancy scores) between the video segments corresponding to the image classifications and the scene types. For instance, the digital content organization system 106 can generate a relevancy score between each image classification of a video segment and a scene type (using the corresponding word vector embeddings).

For instance, the digital content organization system 106 can utilize distances between the word vector embeddings to determine relevancies (or relevancy scores) between the video segments corresponding to the image classifications and the scene types. In some cases, the digital content organization system 106 determines distances between the word vector embeddings (of the image classifications and the scene types) in an embedding space utilizing approaches, such as, but not limited to cosine similarity and/or Euclidean distances.

In addition, the digital content organization system 106 can also apply weights to the distances between the word vector embeddings (of the image classifications and the scene types) based on confidence scores for the image classifications of frames in a video segment. For instance, the digital content organization system 106 can determine a confidence score or level of an image classification from the image classifier for one or more frames of the video segment. Then, the digital content organization system 106 can utilize the confidence score as a weight for a distance between word vector embeddings of a scene type and an image classification corresponding to the confidence score.

Upon determining the relevancies (or relevancy scores) between each combination of each image classification of a video segment and each scene type (using the corresponding word vector embeddings), the digital content organization system 106 can determine a mapping between the corresponding video segment and one or more scene types. For instance, the digital content organization system 106 can sort the relevancies (or relevancy scores) between each image classification of a video segment and a scene type to determine image classifications and scene types with significant relevancy scores (e.g., a top threshold number of relevancy scores). Then, the digital content organization system 106 can utilize the determine image classifications and scene types with significant relevancy scores (e.g., a top threshold number of relevancy scores and/or relevancy scores that satisfy a threshold relevancy score) to assign scene types to the video segment corresponding to the image classifications.

In some embodiments, the digital content organization system 106 further utilizes transcription data with the image classification data for the video segments to determine mappings between the video segments and one or more scene types. In particular, the digital content organization system 106 can identify transcript data for a video segment at a particular timestamp and convert the text from the transcript data to word vector embeddings using a text encoder (as described above). The digital content organization system 106 can utilize the word vector embeddings of the transcript data to determine mappings between scene types and video segments using various approaches, such as, but not limited to late fusion and/or early fusion.

In some cases, as an example of late fusion, the digital content organization system 106 combines relevancy scores between image classification data and the scene types and relevancy scores between the transcript data and the scene types to determine mappings between scene types and the video segments. For example, in some cases, the digital content organization system 106 determines relevancy scores of scene types to video segments based on word vector embeddings generated from the frames of the video segment (e.g., image classifications). For example, in some cases, the digital content organization system 106 utilizes a contrastive language-image pre-training model to compute relevancy scores of scene types to video segments based on word vector embeddings generated from the frames of the video segment (e.g., image classifications). Indeed, in one or more embodiments, the digital content organization system 106 can generate (e.g., utilizing the contrastive language-image pre-training model) an output list of relevancy scores per scene type (e.g., query) for a video segment (e.g., represented with a start time, start_ts, and an end time, end_ts) in accordance with the following output list:

{query:[(video,start_ts,end_ts,score),(video,start_ts, end_ts,score), . . . ], . . . } (1)

In some instances, the digital content organization system 106 utilizes the contrastive language-image pre-training model to learn relationships between sentences (and/or words) and an image (e.g., a video frame) that the sentence or word describes in relation to the image.

In addition, the digital content organization system 106 can utilize transcript data from the video segment to generate word vector embeddings and compare the word vector embeddings to word vector embeddings of the scene types to generate relevancy scores between the transcript data and the scene types. For instance, the digital content organization system 106 can determine a transcript containing a list of tuples (e.g., [word, start_ts, end_ts]). Moreover, using the scene types (e.g., queries), the digital content organization system 106 can generate an output list of relevancy scores per scene type for video segments based on associated transcript data in accordance with the following output list:

{query:[(video,start_ts,end_ts,score),(video,start_ts, end_ts,score), . . . ], . . . } (2)

Then, as part of the late fusion approach, the digital content organization system 106 can merge the outputs of the relevancy scores with scene types based on the image classification data and the outputs of the relevancy scores with scene types based on the transcript data to determine a final set of relevancy scores between scene types and video segments. Subsequently, the digital content organization system 106 utilizes the final set of relevancy scores between scene types and video segments to determine mappings between the scene types and video segments.

In some cases, the digital content organization system 106 identifies a (max) relevancy score from the final set of relevancy scores between scene types and video segments at various time intervals t of the video files (corresponding to the video segments) per scene type on each video file (e.g., as a 1-dimensional score function). Then, the digital content organization system 106 determines various video segments from the time intervals t (e.g., cut points) that correspond to relevancy scores with particular scene types that meets or satisfies a threshold relevancy score (e.g., equal to or greater than the threshold relevancy score). Indeed, the digital content organization system 106 can utilize a particular scene type corresponding to a video segment (e.g., a time interval) when the relevancy score between the scene type and video segment pair meets or satisfies a threshold relevancy score. The digital content organization system 106 can generate a list of all such scene type and video segment pairings and utilize the list as the mappings between scene types and video segments.

In some instances, the digital content organization system 106 can identify short, unusable video segments within the video segment and scene type pairs with relevancy scores. In one or more implementations, to prevent short, unusable video segments, the digital content organization system 106 can apply a dilation image processing operation and/or a computer-vision style bilateral filter within video segments (e.g., represented in a 1-dimensional score function). In some instances, the digital content organization system 106 can apply a dilation image processing operation and/or a computer-vision style bilateral filter that introduces a blur effect on the video segments within the 1-dimensional score function to expand the size of the video segments (per video segment and scene type paired relevancy scores).

In one or more embodiments, the digital content organization system 106 utilizes a scoring algorithm to determine scene type and video segment pairings from relevancy scores to determine the mappings between scene types and video segments. For instance, the digital content organization system 106 can utilize an average score per interval for endpoints (a and b) of a video segment (e.g., an interval) having a score(t) at a given time interval t of the video segment in accordance with the following function:

$$S(a, b) = \frac{\sum_{t \in [a,b]} \text{score}(t)}{b - a}$$ (3)

Indeed, the digital content organization system 106 utilizes the above-mentioned function (3) to generate an average score per interval $S(a, b)$ over an entire duration of a video for all possible cut points a, b (as segments). In some instances, the digital content organization system 106 utilizes generates the average score per interval $S(a, b)$ utilizing a cumulative summation.

Then, the digital content organization system 106 identifies a list of intervals I (e.g., video segments) with various cut points a, b in accordance with the following function:

$$I=\{(a_1,b_1),(a_2,b_2),\ldots\} \quad (4)$$

Furthermore, utilizing the list of intervals I, the digital content organization system 106 can define an objective function to maximize the average score of all intervals while minimizing a number of intervals ($\|I\|$) using a weighting factor ($\lambda$) in accordance with the following function:

$$\operatorname{argmax}_I[\Sigma_{(a,b)\in I}S(a,b)-\lambda\|I\|] \quad (5)$$

In the above-mentioned function (5), the digital content organization system 106 can maximize an average score of the intervals (e.g., video segments) in accordance with the following function:

$$\operatorname{sum}_{(a,b)\in I}S(a,b) \quad (6)$$

Moreover, to determine the mappings between the video segments and scene types, the digital content organization system 106 can identify video segments a,b with a max average score S(a, b) for one or more of the scene types. In some cases, the digital content organization system 106 adds an interval set to the output interval set to determine whether the objective function improves for newly added interval sets (e.g., video segments). If, after adding the interval set, the objective function improves (e.g., outputs a new maximum average score), the digital content organization system 106 can removal all S(a, b) that overlap with the newly added interval. In some cases, the digital content organization system 106 iteratively performs the above-mentioned objective function until the objective function does not improve from newly added intervals (e.g., utilizing the most previous set of results that improved the objective function).

In some embodiments, the digital content organization system 106 can directly compare word vector embeddings (or relevancy scores from the embeddings) from the image and transcript data to determine the mappings between video segments and scene types. For instance, the digital content organization system 106 can merge the outputs of the relevancy scores with scene types based on the image classification data and the outputs of the relevancy scores with scene types based on the transcript data to determine a final set of relevancy scores between scene types and video segments (as described in functions (1) and (2)). Subsequently, the digital content organization system 106 utilizes the final set of relevancy scores between scene types and video segments to determine mappings between the scene types and video segments by selecting a scene type for the video segment that corresponds to a highest relevancy score. In some instances, the digital content organization system 106 utilizes a threshold relevancy score and selects each scene type for the video segment that satisfies the threshold relevancy score.

Furthermore, in some embodiments, the digital content organization system 106 can utilize an early fusion approach to determine mappings between scene types and video segments. For example, the digital content organization system 106 can fuse (or combine) word vector embeddings from the image classifications (determined as described above) and word vector embeddings from the transcript data (determined as described above) to generate combined word vector embeddings in an embedded space. Then, the digital content organization system 106 can compare the combined word vector embeddings to word vector embeddings of the scene types (e.g., to generate relevancy scores) to determine pairings between the video segments (corresponding to the image classifications and transcript data) and the scene types. Indeed, in one or more embodiments, the digital content organization system 106 can utilize pairings with maximum relevancy scores and/or relevancy scores that satisfy a threshold relevancy score as the mappings between video segments and scene types.

Moreover, the digital content organization system 106 can utilize various other approaches to determine mappings between video segments and scene types. For instance, in some cases, the digital content organization system 106 can utilize transcript matching using transformers with the video segments and transcript data to determine mappings of video segments to scene types. Moreover, in some instances, the digital content organization system 106 can utilize a multi-grained contrastive language-image pre-training model (for video-text retrieval) to determine mappings of video segments to scene types. In addition, the digital content organization system 106 can utilize exact word matching, sentence matching, topic matching (e.g., via clustering, moving average sentence vectors, Bayesian modeling), discourse vectors, transformer models (e.g., Sentence-BERT and/or BERT), and/or multimodal modeling to determine mappings of video segments to scene types. In addition, the digital content organization system 106 can utilize various other fusion techniques to determine mappings of video segments to scene types, such as, but not limited to late fusion with bilateral filtering and/or mid-state fusion.

In one or more embodiments, the digital content organization system 106 can further utilize an audio analysis to determine mappings of video segments to scene types. For instance, the digital content organization system 106 can utilize audio classification to determine audio classifications, such as, but not limited to, music classifications and/or sound classifications (e.g., music, firework sounds, speech audio, silence, conversation classification, narration classification, detecting people speaking indoors, detecting glasses clinking, detecting clapping). Then, the digital content organization system 106 can generate word vector embeddings form the audio classifications (at the various video segments) and utilize the word vector embeddings with the word vector embeddings of the image classifications and/or transcript data (e.g., via late or early fusion) to compare the word vector embeddings with scene types. Indeed, the digital content organization system 106 can utilize the relevancies between the word vector embeddings generated from the audio classifications and the scene types to assist in determining mappings of video segments to scene types (in accordance with one or more implementations herein).

Additionally, in some implementations, the digital content organization system 106 can utilize various other input data to determine mappings of video segments to scene types. For example, the digital content organization system 106 can utilize input data, such as, but not limited to text documents describing a video file (e.g., a text description), a shot list (e.g., a text description that indicates or provides notes for various shots and intervals in a video file), metadata for the video file, and/or pre-made scripts for a video (e.g., a movie script or other theatrical script for a video file). Indeed, the digital content organization system 106 can generate word vector embeddings for the above-mentioned input data and utilize the word vector embeddings (in accordance with one or more implementations herein) to determine mappings of video segments to scene types.

Furthermore, in one or more implementations, the digital content organization system 106 can utilize video proxies (or caching) to determine mappings of video segments to scene types (e.g., using one or more of the above-mentioned approaches). For instance, the digital content organization system 106 can receive video file proxies or video file caches (e.g., low resolution versions of the video files) for a set of video files (e.g., video files being uploaded in full resolution and/or downloaded in full resolution). The digital content organization system 106 can determine video segments and determine mappings between video segments from the video files and one or more identified scene types using the video file proxies while the set of video files is unavailable (e.g., an upload and/or download is in progress). Then, upon availability of the set of video files, the digital content organization system 106 can apply the reference markers and/or other determined mappings between video segments and scene types (from the video proxies) to the set of video files (e.g., to display collection objects in GUIs as described herein).

Figure 7:
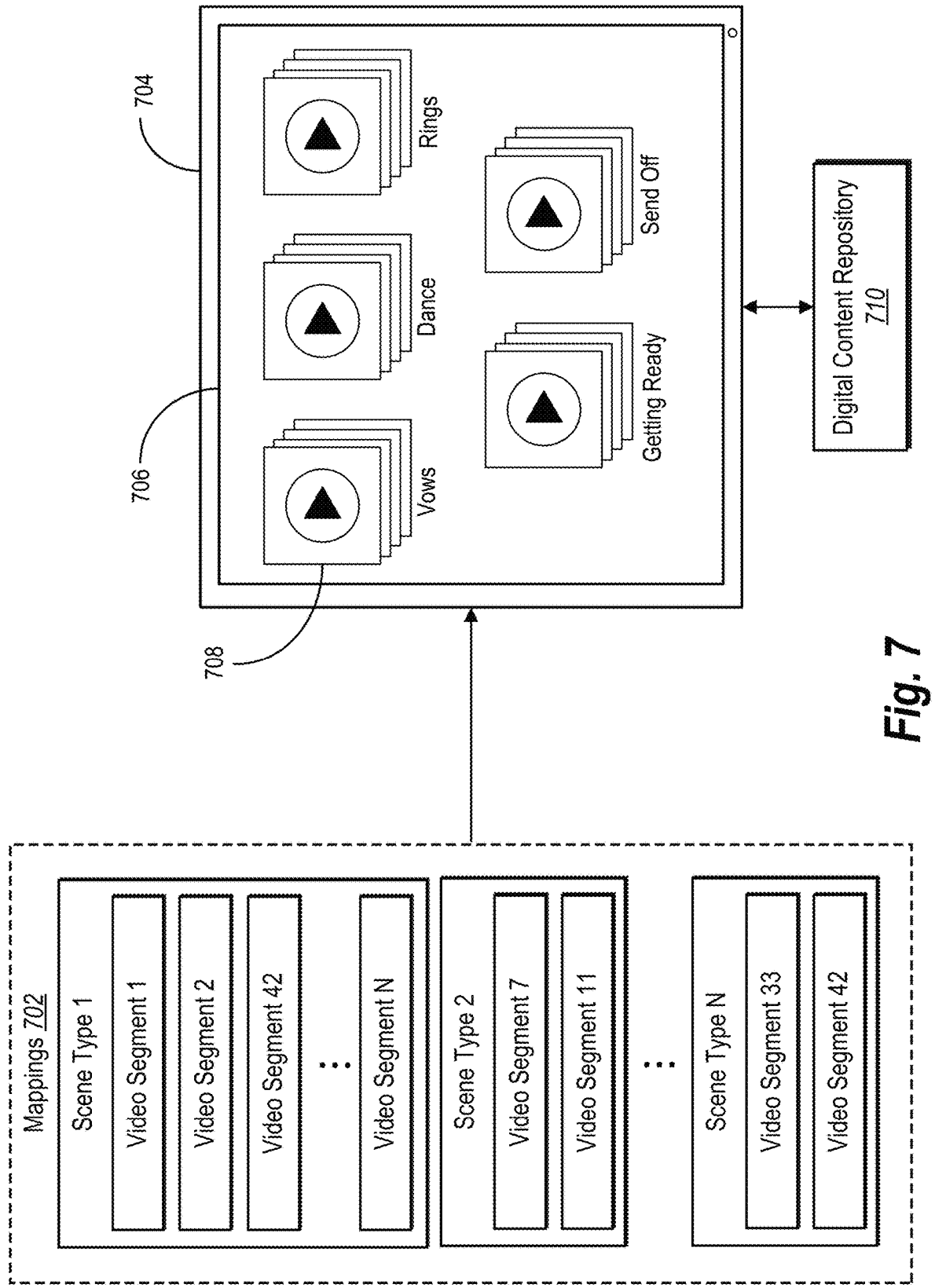
FIG. 7 illustrates an example of a digital content organization system displaying graphical user interfaces with collection objects that portray various video segments from video files grouped according to scene types in accordance with one or more implementations.

As mentioned above, upon determining mappings between video segments and scene types, the digital content organization system 106 can provide, for display within graphical user interfaces, collection objects that portray various video segments from video files grouped according to scene types. For instance, FIG. 7 illustrates the digital content organization system 106 displaying collection objects that portray various video segments from video files grouped according to scene types. In particular, as shown in FIG. 7, the digital content organization system 106 utilizes mappings 702 (determined according to one or more implementations herein) of video segments to scene types to provide, for display within a graphical user interface 706 of a client device 704, a collection object 708 that portrays video segments grouped by scene type.

In one or more embodiments, as shown in FIG. 7, the digital content organization system 106 utilizes the mappings 702 between the scene types and video segments to generate the collection object 708. For instance, the digital content organization system 106 groups the video segments mapped under scene type 1 (e.g., "Vows") from the mappings 702 to generate the collection object 708 with the grouped video segments. Additionally, as shown in FIG. 7, the digital content organization system 106 can utilize a digital content repository 710 to reference the digital video files for the video segments within the mappings 702. In particular, the digital content organization system 106, utilizes reference markers corresponding to the video segment representations in the mappings 702 to identify relevant video files in the digital content repository and display the video segments within the collection object 708.

As further shown in FIG. 7, the digital content organization system 106 provides, for display within the graphical user interface 706 of the client device, multiple collection objects to portray sets of video segments grouped by scene types mapped to the video segments. As shown in FIG. 7, the digital content organization system 106 utilizes the mappings 702 to generate and display collection objects for various video segments that are mapped to particular scene types (e.g., scene type 1 through scene type N). For example, as shown in FIG. 7, the digital content organization system 106 can display a first set of video segments under a first scene type (e.g., "vows") as the collection object 708 and display a second set of video segments under a second scene type (e.g., "dance") as an additional collection object.

As mentioned above, in one or more embodiments, the digital content organization system 106 can display collection objects with video segments grouped by scene types utilizing reference markers (or pointers) to one or more video files. For example, in one or more embodiments, the digital content organization system 106 utilizes a set of reference markers (or pointers) that include a video file name (or address), timestamps for the video segment, and/or one or more labeled scene types. Then, to display the video segments within a collection object or other file management GUI, the digital content organization system 106 utilizes the reference marker to retrieve video content for the video segment from a video file in a digital content repository (e.g., the digital content repository 710) by using the video file name (or address) and the timestamps for the video segment. Moreover, as shown in FIG. 7, the digital content organization system 106 further groups the video segment with other video segments that are mapped to the same scene type.

Moreover, in some cases, the digital content organization system 106 can generate video files (e.g., additional video files) from one or more video segments that are mapped to a scene type (e.g., a subset of video segments). Then, the digital content organization system 106 can display one or more collection objects with video segments grouped by scene types utilizing the additional video files. Specifically, the digital content organization system 106 can display a collection object to portray video segments directly from the additional video files created for the video segments (that map to a particular scene type).

In some implementations, the digital content organization system 106 can display, within a graphical user interface, various video segments from multiple video files within a collection object to group the video segments by scene type. In particular, the digital content organization system 106 can identify that a first video segment from a first video file and a second video segment from a second video file map to a scene type. Then, the digital content organization system 106 can provide, for display within a graphical user interface, the first and second video segment (from the different video files) within a collection object that groups the video segments by the scene type.

Moreover, the digital content organization system 106 can provide, for display within a graphical user interface, one or more interactable collection objects with video segments grouped by scene type. In particular, the digital content organization system 106 can enable access to one or more video segments within a collection object via user interaction with the collection object. For instance, upon receiving a user interaction (e.g., a user selection) of a collection object, the digital content organization system 106 can cause the collection object to expand and display each video segment within the collection object and/or display a user interface to display each video segment and information for the video segment.

In some instances, the digital content organization system 106 can provide, for display within a graphical user interface, one or more collection object with playable video segments grouped by scene type. For instance, the digital content organization system 106 can enable playback of a video segment within a collection object upon receiving a user interaction with the video segment. For example, upon receiving a user interaction (e.g., a user selection) of a video segment, displayed in a collection object (as shown in FIG. 7), the digital content organization system 106 can cause playback of the video segment within the video segment thumbnail icon and/or display a video player to playback the video segment.

Additionally, in one or more embodiments, the digital content organization system 106 can provide selectable options for the collection objects to store video segments as separate video files. For example, the digital content organization system 106 can receive a user interaction with a selectable option to save video segments in a collection object as video files.

In response to the user interaction requesting to save the video segments, the digital content organization system 106 can store the video segment as additional (and/or separate) video files grouped (or labeled) with the scene type. In some cases, the digital content organization system 106 stores the video segments as video files within a folder corresponding to the scene type.

Moreover, in some implementations, the digital content organization system 106 can provide selectable options for the collection objects to share the video segments grouped by scene types. For instance, the digital content organization system 106 can provide selectable options to enable sharing of the video segments grouped by scene types with one or more other user accounts of the digital content organization system 106 (e.g., as collaborators). Moreover, in some cases, the digital content organization system 106 can share the video segments grouped by scene types via the digital content organization system 106, email, and/or file transfer to other client devices (e.g., as video files for the video segments grouped by scene type).

Figure 8A:
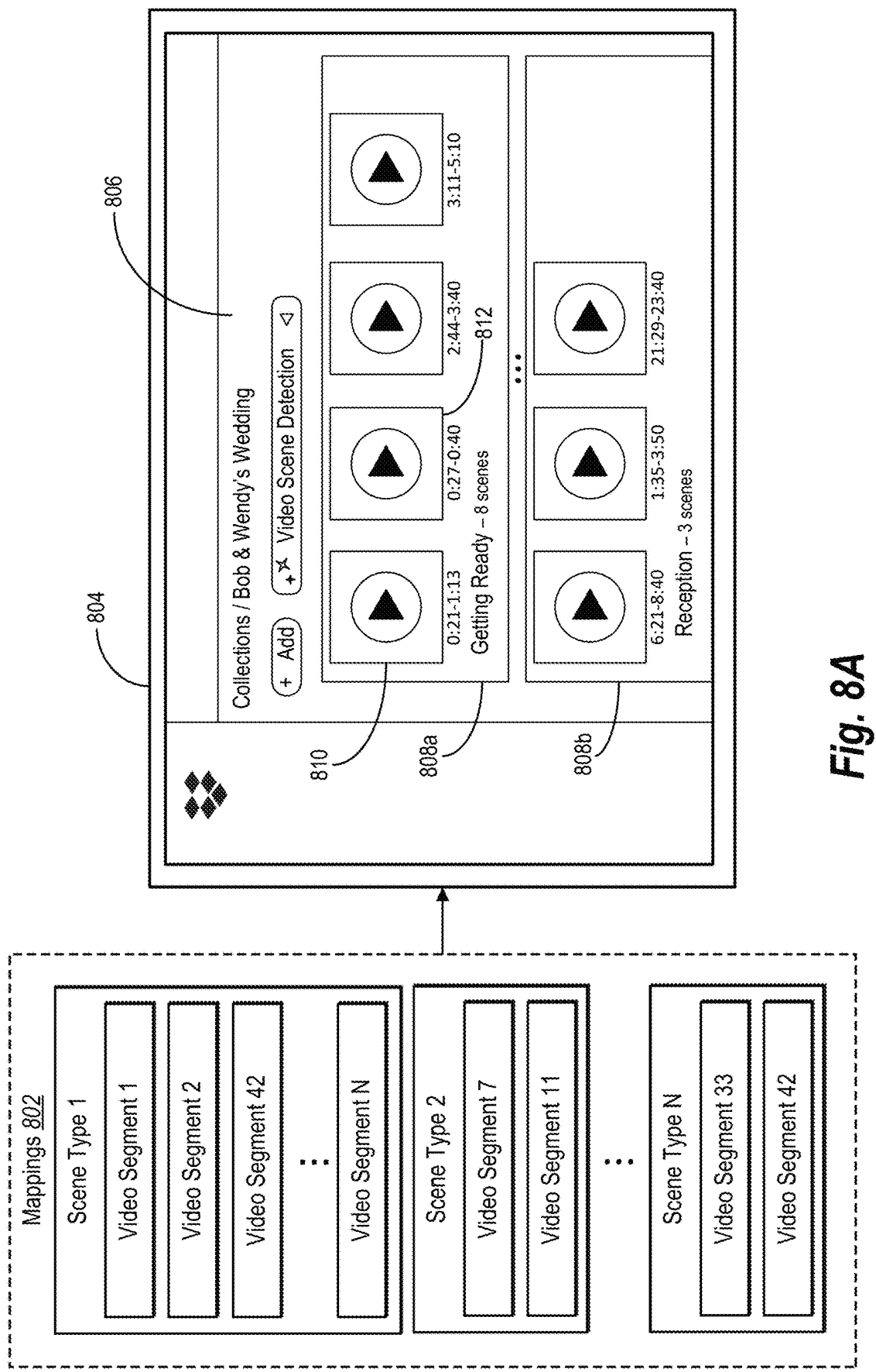
FIGS. 8A-8C illustrate examples of a digital content organization system displaying graphical user interfaces with collection objects that portray various video segments from video files grouped according to scene types in accordance with one or more implementations.
Figure 8B:
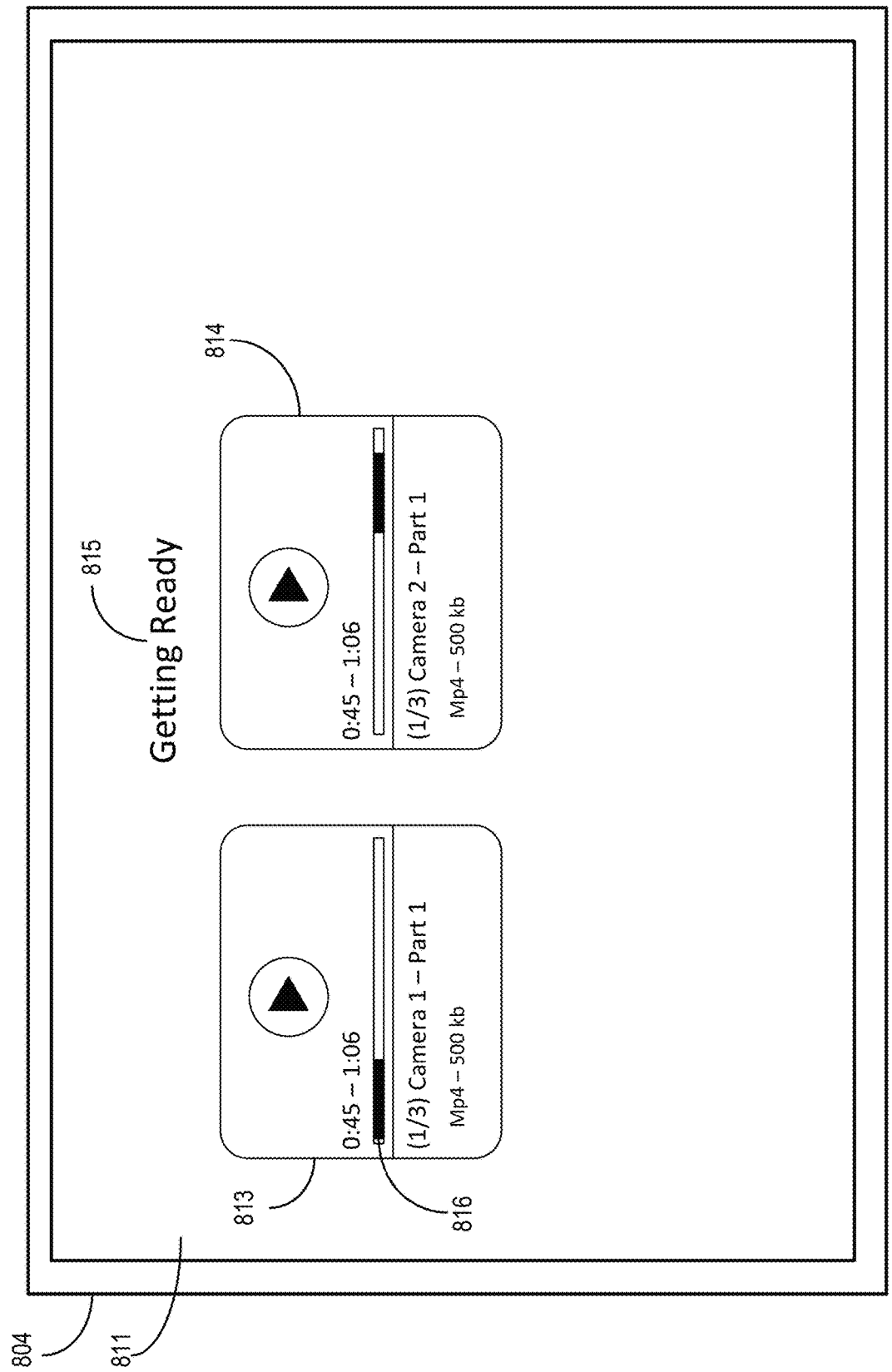
Figure 8C:
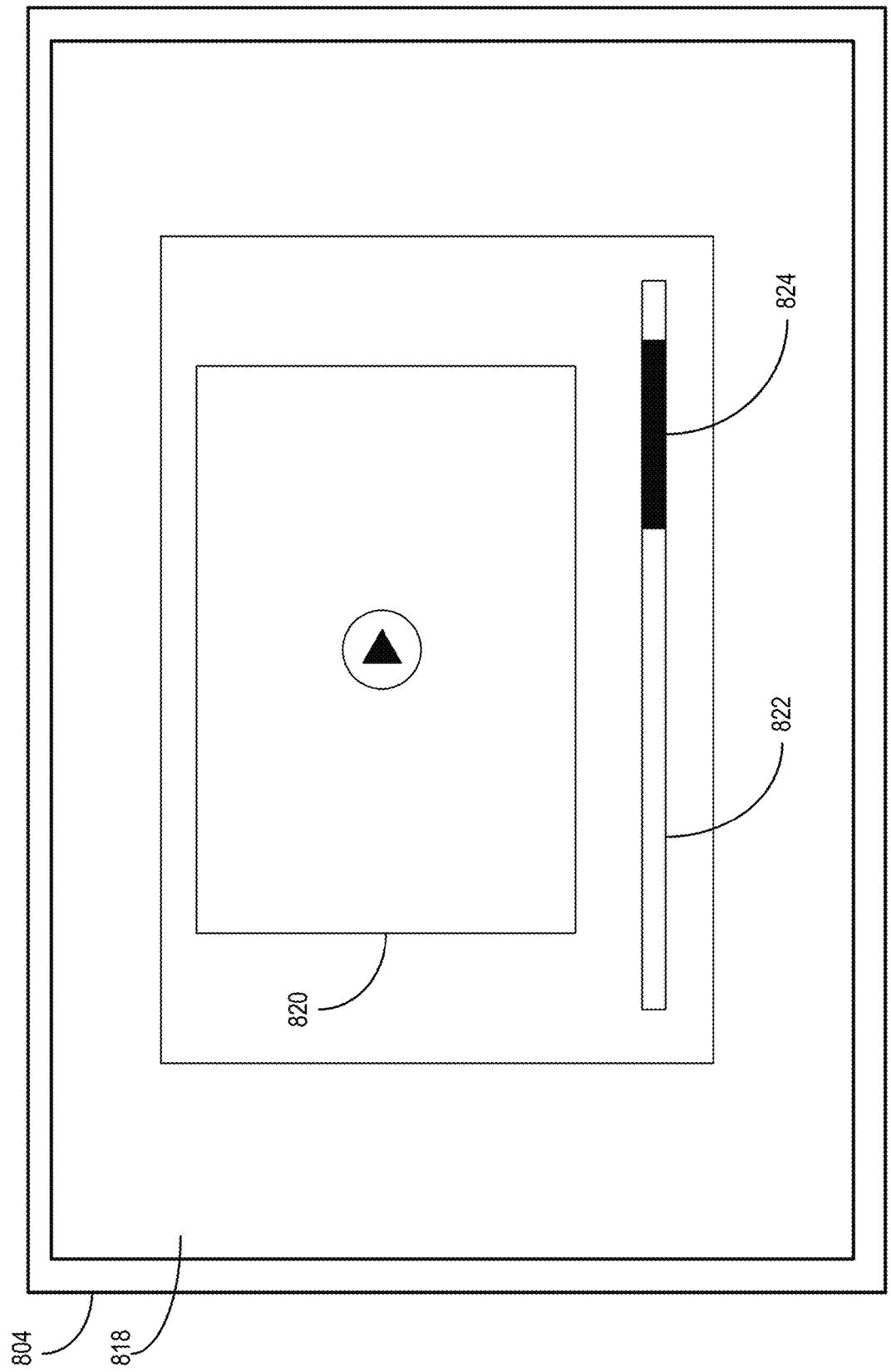

Furthermore, FIGS. 8A-8C also illustrates the digital content organization system 106 provide, for display within a graphical user interface, collection objects portraying multiple video segments grouped by scene type. For instance, as shown in FIG. 8A, the digital content organization system 106 utilizes mappings 802 (determined according to one or more implementations herein) of video segments to scene types to provide, for display within a graphical user interface 806 of a client device 804, a collection object 808*a* and a collection object 808*b* portraying video segments grouped by scene type. Indeed, as shown in FIG. 8A, the digital content organization system 106 provides, for display within the graphical user interface 806, a video segment 810 (e.g., with a timestamp from a video file), a video segment 812 (e.g., with another timestamp from a video file), and various other video segments that are mapped to the scene type of "Getting Ready" within the collection object 808*a*. In some cases, the video segment 810 and the video segment 812 can be from different video files.

As shown in FIG. 8A, the digital content organization system 106 can utilize reference markers for the video segments to display timestamps of the video segments from the video files that include the video segments. Furthermore, in some cases, the digital content organization system 106 can provide selectable options to store the video segments in the collection object 808*a* and/or the collection object 808*b* in relation to a scene type (as described above). Additionally, in some cases, the digital content organization system 106 can also enable user interactions with the video segments in the collection object 808*a* and/or the collection object 808*b* to cause playback of the video segment within the video segment thumbnail icon and/or display a video player to playback the video segment (as described above).

Furthermore, in one or more embodiments, the digital content organization system 106 receives (or identifies) additional video files and updates displayed collection objects with video segments from the additional video files. To illustrate, the digital content organization system 106 can, upon receiving additional video files, utilize a machine learning model to determine mappings of the video segments from the additional video files to identified scene types (in accordance with one or more implementations herein). Then, the digital content organization system 106 can provide, for display within a graphical user interface, updated collection objects that include the video segments from the additional video files grouped based on the mappings to the scene types.

In some instances, the digital content organization system 106 can receive a user selection of a scene type and provide, for display within a graphical user interface, video segments from one or more video files that correspond to the selected scene type. For instance, as shown in FIG. 8B, upon receiving a user selection of a scene type, the digital content organization system 106 can provide, for display within a graphical user interface 811 of the client device 804, a first video segment 813 and a second video segment 814 for a scene type 815. As shown in FIG. 8B, the digital content organization system 106 displays the first video segment 813 with an association to a first video file and the second video segment 814 with an association to a second video file.

Additionally, as shown in FIG. 8B, the digital content organization system 106 can display, within a video timeline of the overall video file, snippets (or portions) to indicate where the video segment belongs in the overall video file. For instance, as shown in FIG. 8B, the digital content organization system 106 displays a marker 816 within a timeline of the video file corresponding to the first video segment 813 to indicate where the first video segment 813 is located in the overall video file.

Furthermore, in some cases, the digital content organization system 106 can enable a user selection of a video segment to expand the video segment and its location within an overall video file. For instance, as shown in the transition from FIG. 8B to FIG. 8C, the digital content organization system 106, upon receiving a selection of a video segment, provides, for display within a graphical user interface 818 of the client device 804, a video player 820 with a video timeline 822 of the overall video file from where the video segment originates. As further shown in FIG. 8C, the digital content organization system 106 displays, within the video timeline, a marker 824 within the video timeline 822 of the video file corresponding to the video segment to indicate where the video segment is located in the overall video file.

In some cases, in reference to FIG. 8C, the digital content organization system 106 can receive user interactions with the marker 824 from the video timeline 822 to adjust and/or modify a length of the video segment corresponding to the scene type 815. For instance, the digital content organization system 106 can receive a user interaction (e.g., click and drag, a click) that expands and/or shrinks the marker 824 to change portions of the overall video file that belong to the scene type 815. For instance, upon receiving a user interaction to expand the marker 824, the digital content organization system 106 includes a longer duration of the overall video file as part of the video segment (which corresponds to the scene type). Likewise, upon receiving a user interaction to shrink the marker 824, the digital content organization system 106 reduces the duration of the overall video file that is part of the video segment (which corresponds to the scene type).

As mentioned above, the digital content organization system 106 can also generate a new video file utilizing video segments mapped to various scene types. For instance, the digital content organization system 106 can generate a video that summarizes the content of various video files by combining one or more video segments from each of the scene types. Indeed, the digital content organization system 106 can utilize a single video segment from each scene type and combine the video segments to generate the video that summarizes the content of various video files.

Figure 9:
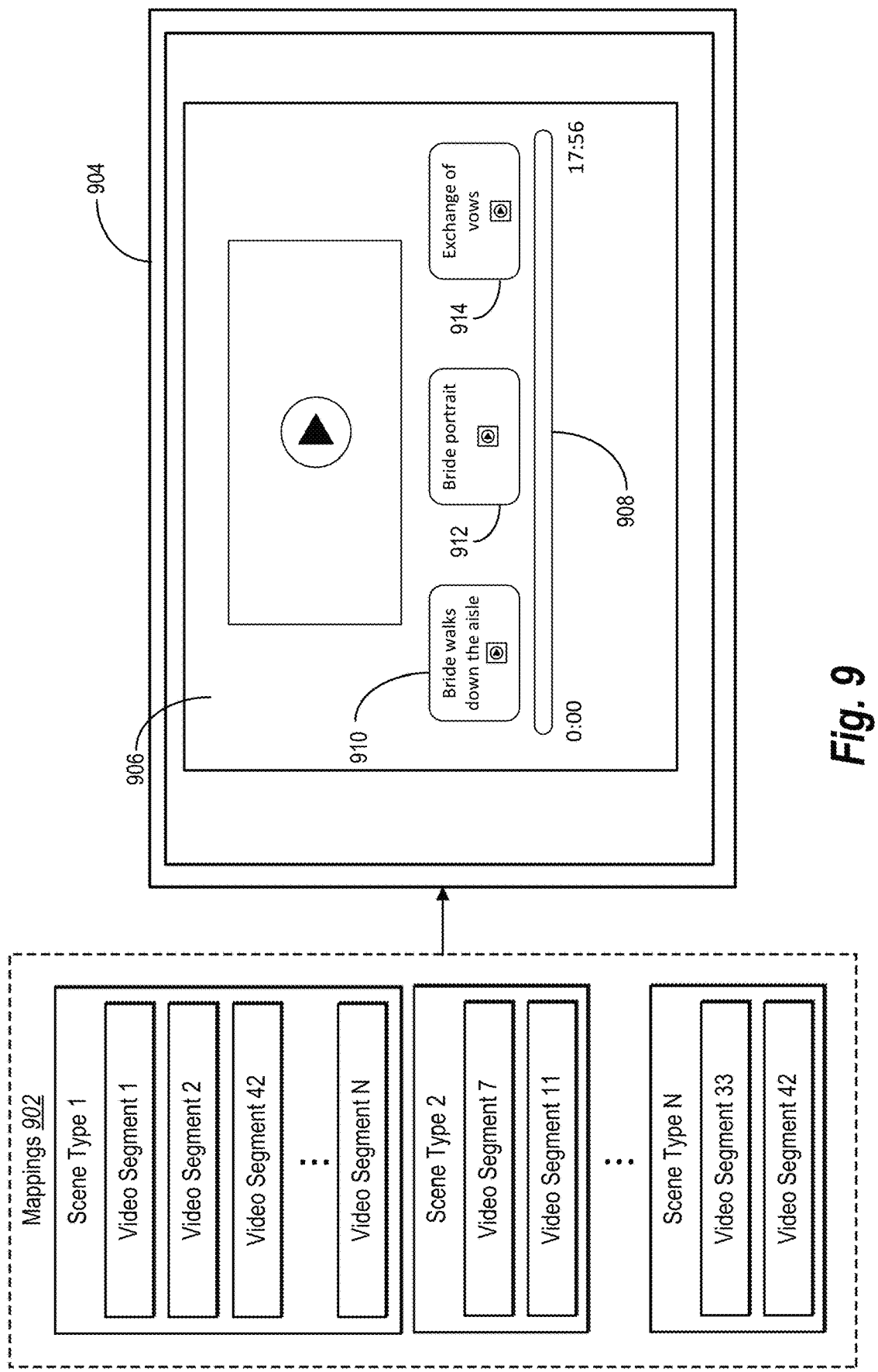
FIG. 9 illustrates a digital content organization system generating a video that summarizes the content of various video files by combining one or more video segments from various scene types in accordance with one or more implementations.

For instance, FIG. 9 illustrates the digital content organization system 106 generating a video that summarizes the content of various video files by combining one or more video segments from each of the scene types. As shown in FIG. 9, the digital content organization system 106 utilizes a video segment from the scene types in the mappings 902 to generate a summary video by combining video segments within a video timeline 908 (in a graphical user interface 906 of a client device 904). As shown in FIG. 9, the digital content organization system 106 utilizes a first video segment 910 for a first scene type (e.g., bride walking down the aisle), followed by a second video segment 912 for a second scene type (e.g., bride portrait), and a third video segment 914 for a third scene type (e.g., exchange of vows) to generate a summary video with a video timeline 908.

In some cases, the digital content organization system 106 utilizes a chronological order of scenes to generate the summary video. For instance, the digital content organization system 106 can identify a chronological order of scene types and order video segments from each scene type based on the chronological order to generate the summary video. In some cases, the digital content organization system 106 receives (or determines) the chronological order of the scene types via, but not limited to, user selection and/or administrator device settings.

In some cases, the digital content organization system 106 utilizes a single video segment from one or more scene types to generate a summary video. Indeed, in one or more embodiments, the digital content organization system 106 automatically selects a video segment from each of the scene types (e.g., based on time durations, based on detected video quality) to generate the summary video. In some implementations, the digital content organization system 106 enables user selection of a representative video segment for each scene type and then, utilizes the user selected video segments for generating the summary video. Furthermore, in some cases, the digital content organization system 106 also enables user selection of one or more scene types to enable or disable video segments from particular scenes in a generated summary video.

In one or more embodiments, the digital content organization system 106 can enable sharing of a generated summary video. For example, the digital content organization system 106 can generate the summary video (as described above) and surface the summary video on a memory section of the content management system 104 (e.g., a suggested video section). In some cases, the digital content organization system 106 can further provide selectable options to share the summary video via email, message, social media, and/or to another user account of the content management system 104.

Figure 10:
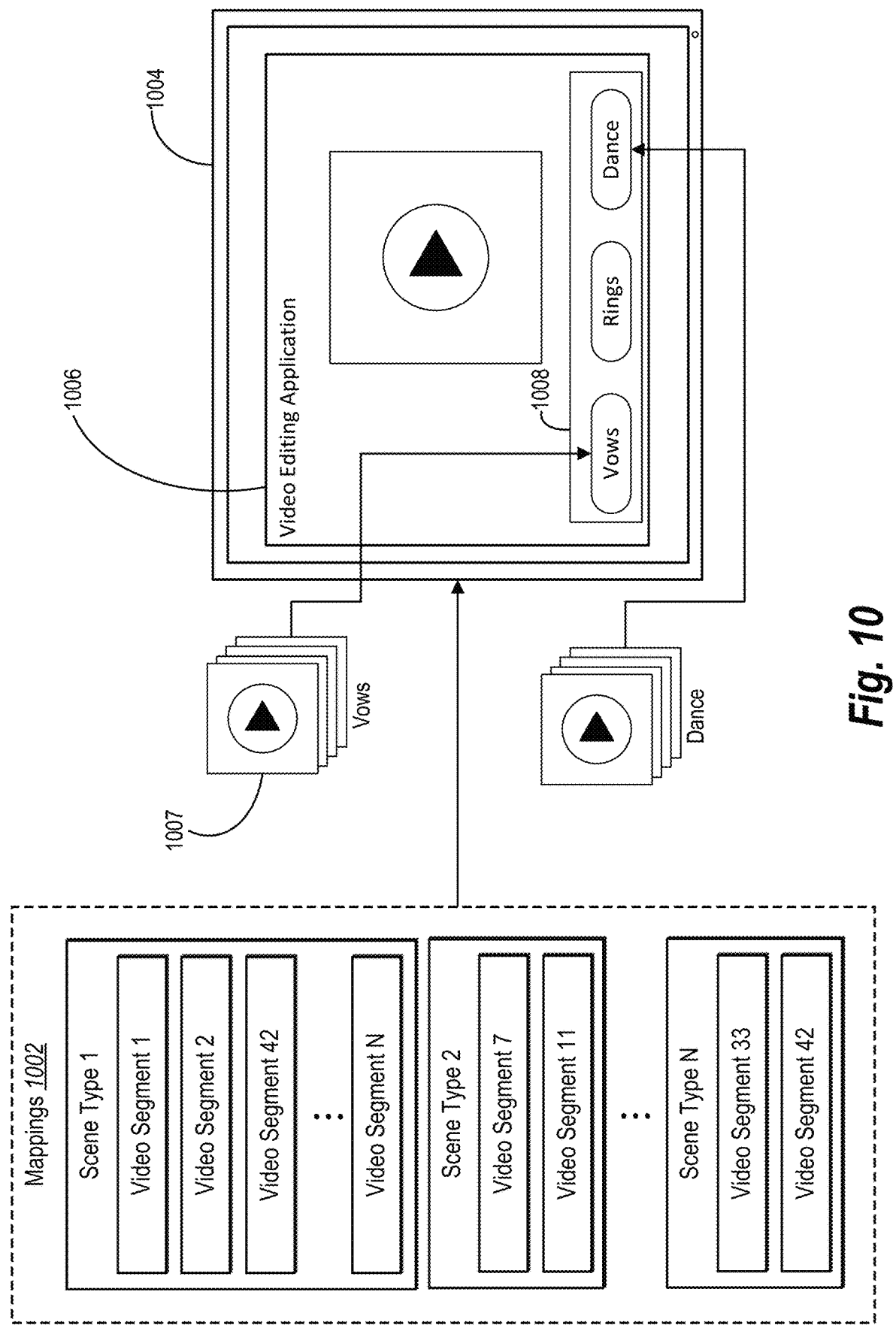
FIG. 10 illustrates a digital content organization system exporting video segments grouped by scene types to a video editing application in accordance with one or more implementations.

As mentioned above, the digital content organization system 106 can also export the video segments grouped by the scene types to various media content editing applications. For example, FIG. 10 illustrates the digital content organization system 106 exporting video segments grouped by scene types to a video editing application. As shown in FIG. 10, the digital content organization system 106 utilizes mappings 1002 (e.g., mappings between video segments and scene types determined in accordance with one or more embodiments herein) to export a collection object 1007 of various video segments grouped by a scene type (e.g., vows) within a video editing application GUI 1006 on a client device 1004. As shown in FIG. 10, the digital content organization system 106 exports the collection object 1007 of various video segments grouped by a scene type within a timeline 1008 of the video editing application GUI 1006.

Likewise, the digital content organization system 106 can export various other collection objects that represent various video segments grouped by other scene types into the video editing application GUI 1006.

In some cases, the digital content organization system 106 exports the group of video segments as video files that are recognized as separate scenes in a video editing application. Specifically, the digital content organization system 106 can export video files for one or more video segments with an identifier for a scene type such that the video editing application can recognize that the video files belong to a specific scene type. By doing so, the digital content organization system 106 can enable the video editing application to display and focus video editing functionalities on the video segments to specific scene types.

Moreover, in one or more implementations, the digital content organization system 106 exports the video segments (or video files) with reference markers (as described above) that indicate scene type associations for the video segments. Indeed, the digital content organization system 106 can provide the reference markers to the video editing application to enable the video editing application to organize video segments (e.g., using file addresses and timestamps from the reference markers) by scene type (e.g., from the labels in the reference markers) while editing and/or presenting videos from the video files.

Additionally, upon exporting the video segments grouped by the scene types to the video editing application, the digital content organization system 106 can enable the video editing application to implement various functionalities for the video segments. For instance, the digital content organization system 106 can enable the video editing application to edit visual data and/or other data of the video segments (e.g., brightness, hue, image modification, saturation, playback speed, cropping size, resolution). In some cases, the digital content organization system 106 can enable the video editing application to crop or stitch various video segments using the scene types (e.g., enabling users to select video segments to include from different scene types in a video). Indeed, the digital content organization system 106 can enable various video editing functionalities for the exported video segments (that are grouped by scene type), such as, but not limited to, visual edits, stitching and/or cropping, and/or adding and/or modifying audio data (e.g., music, removing background noise).

Furthermore, although one or more embodiments illustrate the digital content organization system 106 exporting video segments based on scene type groupings to a video editing application, the digital content organization system 106 can implement one or more video editing functionalities for the video segments within a graphical user interface of the digital content organization system 106. For instance, the digital content organization system 106 can provide, for display within a graphical user interface of a client device, a file management UI that displays the collection objects with the video segments grouped by scene type. In addition, the digital content organization system 106 can provide, for display, selectable options for the collection objects and/or video segments to edit the video segments (using functionalities described above for a video editing application).

Additionally, in one or more embodiments, the digital content organization system 106 can enable search features for the video segments from the video files based on the mapped scene types. For instance, the digital content organization system 106 can, within the content management system 104, receive a search query that is relevant to a scene type (or a keyword corresponding to the scene type). The digital content organization system 106 can utilize the search query to surface within a GUI, as search results, one or more video segments from the video files based on the search query matching one or more scene types corresponding to the video segments.

Moreover, in some cases, the digital content organization system 106 can also display video segments that are mapped to an unknown scene type (e.g., no scene type determined). The digital content organization system 106 can provide, within a graphical user interface, selectable options to manually associate the video segment with an unknown scene type to a known scene type (e.g., via user selection). For instance, the digital content organization system 106 can receive a selection of a scene type for a video segment via a drop-down menu selection and/or receive a click and drag interaction of the video segment to a collection object corresponding to a scene type. In some instances, the digital content organization system 106 can utilize the scene type selection to learn parameters and/or train the machine learning model to improve the accuracy of mapping scene types to video segments.

Figure 11:
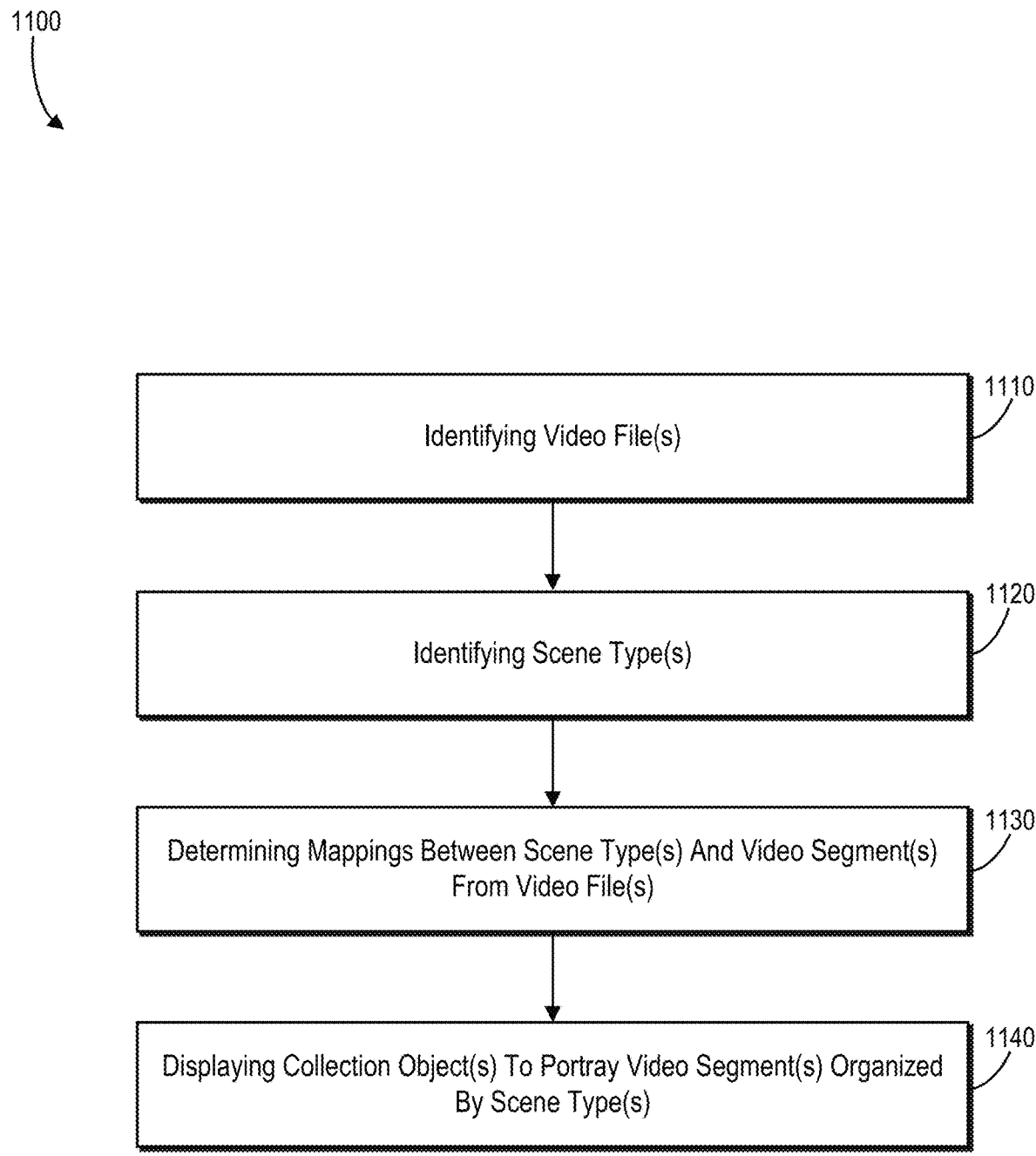
FIG. 11 illustrates a flowchart of a series of acts for creating and displaying a collection of video segments from unorganized video files to organize the video segments by scene types in accordance with one or more implementations.

FIGS. 1-10, the corresponding text, and the examples provide a number of different methods, systems, devices, and non-transitory computer-readable media of the digital content organization system 106. In addition to the foregoing, one or more implementations can also be described in terms of flowcharts comprising acts for accomplishing a particular result, as shown in FIG. 11. The acts shown in FIG. 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 11. In some implementations, a system can be configured to perform the acts of FIG. 11. Alternatively, the acts of FIG. 11 can be performed as part of a computer-implemented method.

FIG. 11 illustrates a flowchart of a series of acts 1100 for creating and displaying a collection of video segments from unorganized video files to organize the video segments by scene types in accordance with one or more implementations. While FIG. 11 illustrates acts according to one implementation, alternative implementations may omit, add to, reorder, and/or modify any of the acts shown in FIG. 11.

As shown in FIG. 11, the series of acts 1100 include an act 1110 of identifying a video file(s). In some cases, the act 1110 can include identifying a plurality of video files. Moreover, the act 1110 can include, for each video file from a plurality of video files, determining video segments for a set of video segments by analyzing a video file to identify scene changes between frames of the video file and utilizing the scene changes to segment the video file.

As shown in FIG. 11, the series of acts 1100 include an act 1120 of identifying a scene type(s). For example, the act 1120 can include identifying a set of scene types. Furthermore, the act 1120 can include identifying one or more text labels for a set of scene types. In addition, the act 1120 can include identifying one or more keywords corresponding to a text label for a scene type (from one or more text labels) or to a scene type.

In some implementations, the act 1120 includes receiving, via user interaction, a request to create a scene type (for a set of scene types). In addition, the act 1120 can include, based on a request to create a scene type, providing, for display within the graphical user interface, a text input element to receive scene types. Moreover, the act 1120 can include utilizing user input text received within the text input element as one or more text labels for a scene type (of the set of scene types).

As shown in FIG. 11, the series of acts 1100 include an act 1130 of determining mappings between the scene type(s) and the video segment(s) from the video file(s). In some embodiments, the act 1130 includes utilizing a machine learning model to determine mappings between a set of video segments from a plurality of video files to scene types from a set of scene types based on data from the plurality of video files. For example, the act 1130 can include determining mappings between a set of video segments to scene types from a set of scene types by utilizing a machine learning model to generate word vector embeddings from video data and transcript data from a plurality of video files. In some cases, a machine learning model can include an image classifier and/or a text encoder. Furthermore, the act 1130 can include determining mappings between a set of video segments to scene types from a set of scene types by utilizing a machine learning model to determine relevancies between word vector embeddings from video data and transcript data from a plurality of video files and additional word vector embeddings for the set of scene types.

In some instances, the act 1130 includes utilizing a machine learning model to identify, based on video data from a plurality of video files and corresponding transcripts for the plurality of video files, mappings between a plurality of video segments, from the plurality of video files, to one or more scene types from a set of scene types. For instance, the act 1130 can include utilizing a machine learning model to generate word vector embeddings from video data from a plurality of video files and from corresponding transcripts for the plurality of video files. Furthermore, the act 1130 can include mapping a video segment to a scene type from a set of scene types based on a relevancy of a word vector embedding, from word vector embeddings, to the scene type.

Additionally, the act 1130 can include utilizing a machine learning model to identify, based on video data from a video file and a transcript for the video file, a mapping between a video segment, from the video file, to a scene type from a set of scene types. For example, the act 1130 can include determining a mapping between a video segment to a scene type from a set of scene types by utilizing a machine learning model to identify relevant scene types from the set of scene types for the video segment utilizing an image classifier and a text encoder.

As further shown in FIG. 11, the series of acts 1100 include an act 1140 of displaying a collection object(s) to portray the video segment(s) organized by the scene type(s). For instance, the act 1140 can include generating a collection object corresponding to a scene type. Moreover, the act 1140 can include providing, for display within a graphical user interface, a collection object to portray a video segment based on a mapping between the video segment and a scene type from a set of scene types. In some cases, the act 1140 can include providing, for display within a graphical user interface, a collection object portraying a video segment as playable video content in association with a scene type mapped to the video segment. Moreover, the act 1140 can include generating a collection object, for a scene type mapped to a video segment, utilizing a reference marker that points to a timestamp corresponding to the video segment from a video file or storing the video segment as an additional video file for the scene type mapped to the video segment.

In some implementations, the act 1140 can include generating a plurality of collection objects corresponding to a set of scene types. In addition, the act 1140 can include storing video segments from a plurality of video segments in association with collection objects from a plurality of collection objects based on mappings between the plurality of video segments and one or more scene types from a set of scene types. Moreover, the act 1140 can include storing a subset of video segments from a plurality of video segments in association with a collection object from a plurality of collection objects based on a subset of video segments mapping to a scene type corresponding to the collection object.

Additionally, the act 1140 can include, based on mappings between a set of video segments and scene types from a set of scene types, providing, for display within a graphical user interface of a client device, a first collection object that portrays a first subset of video segments from a set of video segments in association with a first scene type from the set of scene types and providing, for display within the graphical user interface of the client device, a second collection object that portrays a second subset of video segments from the set of video segments in association with a second scene type from the set of scene types. In some cases, the act 1140 can include generating a first collection object by utilizing reference markers that point to timestamps corresponding to a first subset of video segments from a plurality of video files. In addition, the act 1140 can include generating one or more additional video files based on a first subset of video segments and utilizing the one or more additional video files for a first collection object. For instance, the act 1140 can include generating one or more additional video files based on a first subset of video segments and providing, for display within a graphical user interface of a client device, a first collection object to portray a first subset of video segments from the one or more additional video files. Moreover, the act 1140 can include exporting a first subset of video segments and a second subset of video segments as separate scene types to a video editing application.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
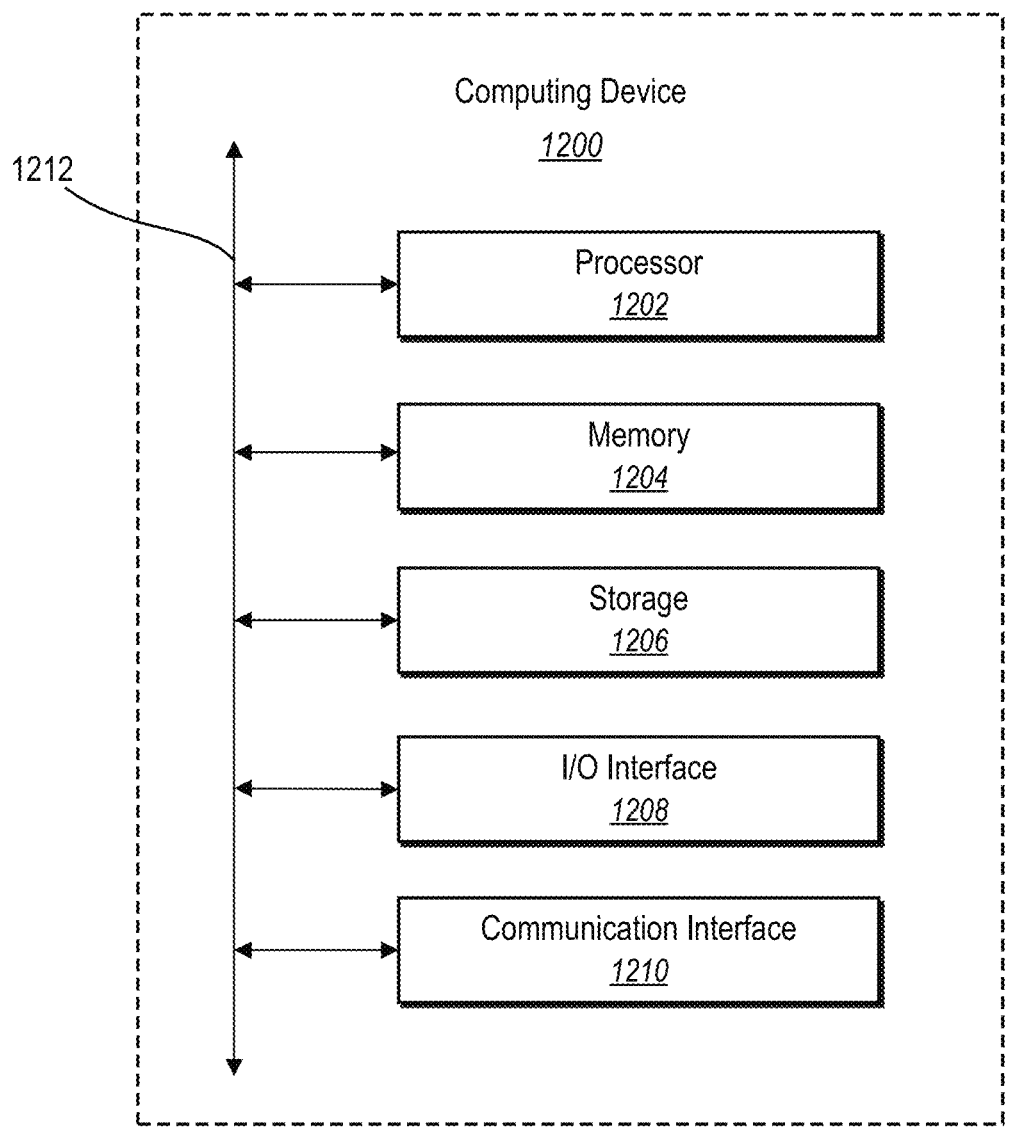
FIG. 12 illustrates a block diagram of an exemplary computing device in accordance with one or more implementations.

FIG. 12 illustrates a block diagram of exemplary computing device 1200 that may be configured to perform one or more of the processes described above. One will appreciate that server device(s) 102 and/or the client device 110 may comprise one or more computing devices, such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular embodiments, storage device 1206 is non-volatile, solid-state memory. In other embodiments, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
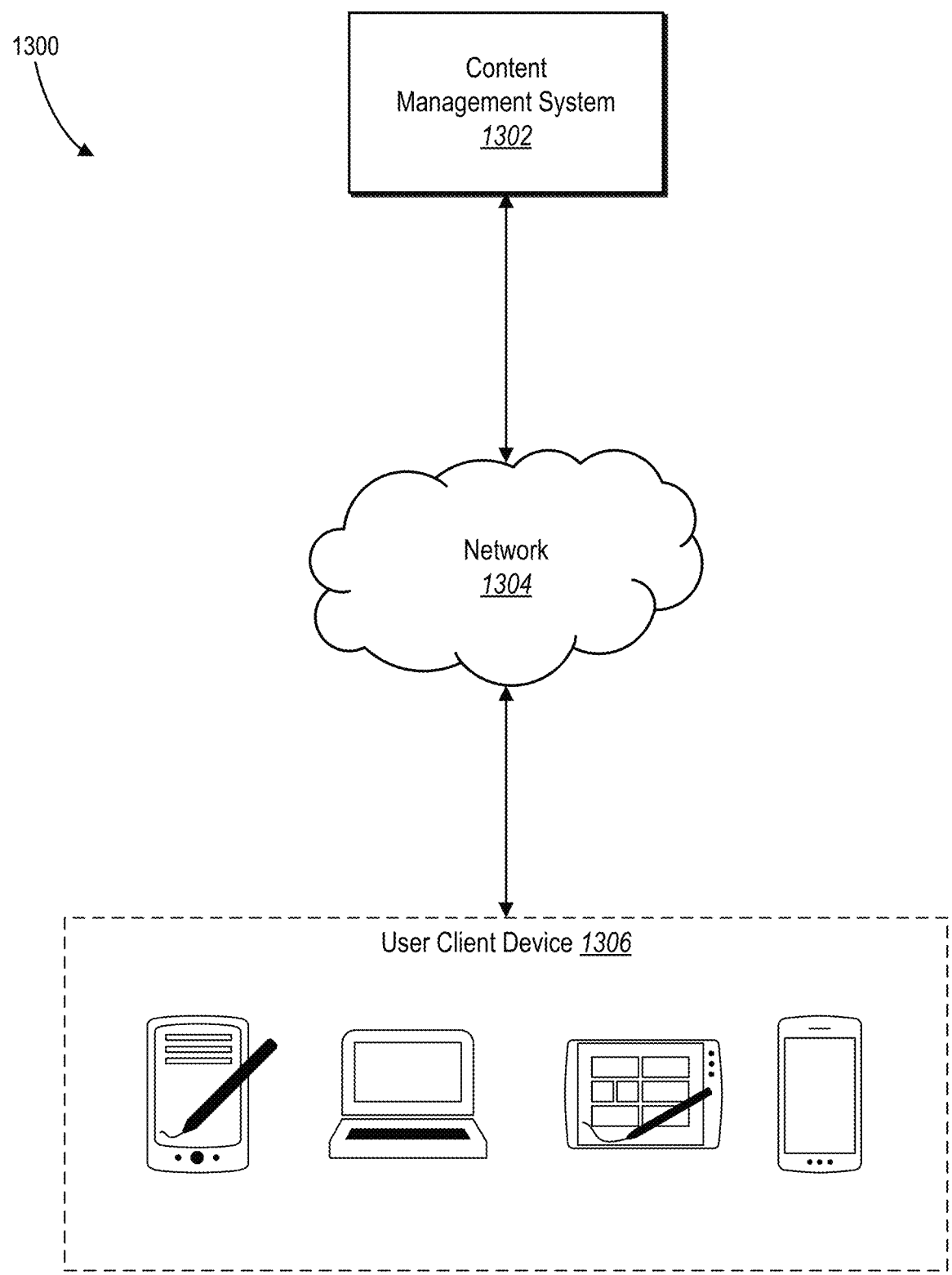
FIG. 13 illustrates an example environment of a networking system in accordance with one or more implementations.

FIG. 13 is a schematic diagram illustrating environment 1100 within which one or more embodiments of content management system 104 can be implemented. Content management system 1302 may generate, store, manage, receive, and send digital content (such as digital videos). For example, content management system 1302 may send and receive digital content to and from client devices 1306 by way of network 1304. In particular, content management system 1302 can store and manage a collection of digital content. Content management system 1302 can manage the sharing of digital content between computing devices associated with a plurality of users. For instance, content management system 1302 can facilitate a user sharing a digital content with another user of content management system 1302.

In particular, content management system 1302 can manage synchronizing digital content across multiple client devices 1306 associated with one or more users. For example, a user may edit digital content using client device 1306. The content management system 1302 can cause client device 1306 to send the edited digital content to content management system 1302. Content management system 1302 then synchronizes the edited digital content on one or more additional computing devices.

In addition to synchronizing digital content across multiple devices, one or more embodiments of content management system 1302 can provide an efficient storage option for users that have large collections of digital content. For example, content management system 1302 can store a collection of digital content on content management system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from content management system 1302. In particular, upon a user selecting a reduced-sized version of digital content, client device 1306 sends a request to content management system 1302 requesting the digital content associated with the reduced-sized version of the digital content. Content management system 1302 can respond to the request by sending the digital content to client device 1306. Client device 1306, upon receiving the digital content, can then present the digital content to the user. In this way, a user can have access to large collections of digital content while minimizing the number of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox for iPhone or iPad, Dropbox for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access content management system 1302.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying a plurality of video files;
   identifying a set of scene types;
   utilizing a machine learning model to determine mappings
      between a set of video segments from the plurality of video files to scene types from the set of scene types based on data from the plurality of video files;

based on the mappings between the set of video segments and the scene types from the set of scene types:

providing, for display within a file management graphical user interface of a client device, a first scene type collection object that displays a first grouping of video files for video segments, identified from the set of video segments from the plurality of video files, that map to a first scene type from the set of scene types; and providing, for display within the file management graphical user interface of the client device, a second scene type collection object that displays a second grouping of video files for video segments, identified from the set of video segments from the plurality of video files, that map to a second scene type from the set of scene types; and based on receiving an electronic file interactions requesting a file organizing operation with the first scene type collection object, generating a folder for the first grouping of video files for the video segments that map to the first scene type.

2. The computer-implemented method of claim 1, further comprising determining the mappings between the set of video segments to the scene types from the set of scene types by:

utilizing the machine learning model to generate a first set of word vector embeddings from video data and a second set of word vector embeddings from transcript data from the set of video segments in the plurality of video files;

generating combined word vector embeddings by fusing word vector embeddings from the first set of word vector embeddings and word vector embeddings from the second set of word vector embeddings; and determining the mappings by based on the combined word vector embeddings.

3. The computer-implemented method of claim 2, wherein the machine learning model comprises an image classifier and a text encoder.

4. The computer-implemented method of claim 2, further comprising determining the mappings between the set of video segments to the scene types from the set of scene types by utilizing relevancy scores between the set of video segments and the set of scene types based on comparisons between the combined word vector embeddings and a set of scene type word vector embeddings of the set of scene types.

5. The computer-implemented method of claim 1, further comprising, for each video file from the plurality of video files, determining video segments for the set of video segments by:

analyzing a video file to identify scene changes between frames of the video file; and utilizing the scene changes to segment the video file.

6. The computer-implemented method of claim 1, further comprising generating the first scene type collection object utilizing a first video segment corresponding to the first scene type from a first video file and a second video segment corresponding to the first scene type from a second video file, wherein the first video file is different from the second video file.

7. The computer-implemented method of claim 1, further comprising:

automatically generating the scene types by identifying one or more keywords from file structure data corresponding to the plurality of video files, wherein the file structure data comprises one or more file names or one or more folder names; and providing, for display within the file management graphical user interface of the client device, a scene type select menu comprising selectable scene types from the automatically generated scene types.

8. The computer-implemented method of claim 1, further comprising:

receiving an additional electronic file interaction requesting a file sharing operation with the first scene type collection object; and based on the file sharing operation, granting, to a client device of a user account, access to the folder for the first grouping of video files for the video segments that map to the first scene type.

9. The computer-implemented method of claim 1, further comprising based on receiving an additional electronic fie interaction requesting an additional file organizing operation, rearranging the first grouping of video files for the video segments that map to the first scene type to generate a chronological order of video segments.

10. The computer-implemented method of claim 1, further comprising:

receiving an additional electronic file interaction requesting a video file exporting operation for with the first scene type collection object;

based on the video file exporting operation, navigating to a video editing application with the video segments from the first scene type collection object; and modifying the video segments from the first scene type collection object based on one or more user interactions in the video editing application.

11. A non-transitory computer-readable medium storing instructions that, when executed by at least one processor, cause a computing device to:

receive a plurality of video files within a folder;

identify a set of scene types for the plurality of video files;

utilize a machine learning model to identify, based on video data from the plurality of video files and corresponding transcripts for the plurality of video files, mappings between a plurality of video segments, from the plurality of video files, to one or more scene types from the set of scene types;

generate a plurality of scene type collection objects corresponding to the set of scene types, wherein the plurality of scene type collection objects represents groupings of video segments from the plurality of video segments by the one or more scene types;

receiving an electronic file interaction requesting a file organizing operation with a particular scene type collection object from the plurality of scene type collection objects; and based on receiving the electronic file interaction, generating, in relation to the folder comprising the plurality of video files within a file management system, an additional folder for the particular scene type collection object for a groupings of video files for a groupings of video segments from the groupings of video segments in association with the particular scene type collection objects from the plurality of scene type collection objects.

12. The non-transitory computer-readable medium of claim 11, further comprising instructions that, when executed by the at least one processor, cause the computing device to:

utilize the machine learning model to generate word vector embeddings from the video data from the plurality of video files and from the corresponding transcripts for the plurality of video files; and map a video segment to a scene type from the set of scene types based on a relevancy of a word vector embedding, from the word vector embeddings, to the scene type.

13. The non-transitory computer-readable medium of claim 11, further comprising instructions that, when executed by the at least one processor, cause the computing device to receive one or more additional electronic file interactions in relation to a groupings of video files for the groupings of video segments, wherein the one or more additional electronic file interactions comprise a file sharing operation or a video file editing export operation.

14. The non-transitory computer-readable medium of claim 11, further comprising instructions that, when executed by the at least one processor, cause the computing device to provide, for display within a file management graphical user interface, the particular scene type collection object displaying a stacked icon of multiple video files for the grouping of video segments corresponding to a scene type of the particular scene type collection object.

15. The non-transitory computer-readable medium of claim 11, further comprising instructions that, when executed by the at least one processor, cause the computing device to provide, for display within a graphical user interface, a playback of a video file of a particular video segment from a groupings of video files for the groupings of video segments with a video timeline indicating a timestamp indicator for an originating video file corresponding to the particular video segment and an indicator for a location of the originating video file corresponding to the particular video segment.

16. A system comprising:
at least one processor; and
at least one non-transitory computer-readable storage medium storing instructions that, when executed by the at least one processor, cause the system to:
identify a plurality of video files;
identify a set of scene types;
utilize a machine learning model to identify, based on video data from the plurality of video files and transcripts for the plurality of video files, mappings between video segments, from the plurality of video files, to a scene type from the set of scene types;

generate a scene type collection object corresponding to the scene type;

provide, for display within a file management graphical user interface, the scene type collection object to display a grouping of video files for video segments based on a mapping between the video segments and the scene type from the set of scene types; and based on receiving an electronic file interactions requesting a file organizing operation with the scene type collection object, generating a folder for the grouping of video files for the video segments that map to the scene type.

17. The system of claim 16, further comprising instructions that, when executed by the at least one processor, cause the system to determine the mapping between the video segments to the scene type from the set of scene types by utilizing the machine learning model to identify relevant scene types from the set of scene types for the video segments utilizing an image classifier and a text encoder.

18. The system of claim 16, further comprising instructions that, when executed by the at least one processor, cause the system to provide, for display within the file management graphical user interface, the scene type collection object portraying the grouping of video files of the video segments as playable video content in association with the scene type mapped to the video segments.

19. The system of claim 16, further comprising instructions that, when executed by the at least one processor, cause the system to:
receive, via user interaction, a request to create a scene type for the set of scene types;
based on the request to create the scene type, providing, for display within the file management graphical user interface, a text input element to receive scene types; and
utilizing user input text received within the text input element as one or more text labels for the set of scene types.

20. The system of claim 16, further comprising instructions that, when executed by the at least one processor, cause the system to generate the scene type collection object, for the scene type mapped to the video segments, utilizing multiple video segments from multiple video files of the plurality of video files.

* * * * *